United States Patent
Vassilvitskii et al.

(10) Patent No.: US 9,652,875 B2
(45) Date of Patent: May 16, 2017

(54) SYSTEMS AND METHODS FOR GENERATING A DENSE GRAPH

(71) Applicant: Yahoo! Inc., Sunnyvale, CA (US)

(72) Inventors: Sergei Vassilvitskii, New York, NY (US); Shanmugasundaram Ravikumar, Sunnyvale, CA (US); Bahman Bahmani, Stanford, CA (US)

(73) Assignee: Yahoo! Inc., Sunnyvale, CA (US)

( * ) Notice: Subject to any disclaimer, the term of this patent is extended or adjusted under 35 U.S.C. 154(b) by 319 days.

(21) Appl. No.: 14/065,108

(22) Filed: Oct. 28, 2013

(65) Prior Publication Data

US 2014/0118355 A1    May 1, 2014

Related U.S. Application Data

(60) Provisional application No. 61/719,882, filed on Oct. 29, 2012.

(51) Int. Cl.
  *G06T 11/20* (2006.01)
  *G06F 17/30* (2006.01)
(52) U.S. Cl.
  CPC ...... *G06T 11/206* (2013.01); *G06F 17/30958* (2013.01)
(58) Field of Classification Search
  CPC ... G06T 11/20; G06T 11/206; G06F 17/30958
  USPC ........................................................ 345/440
  See application file for complete search history.

(56) References Cited

U.S. PATENT DOCUMENTS

| | | |
|---|---|---|
| 6,222,939 B1 | 4/2001 | Wiskott et al. |
| 6,356,659 B1 | 3/2002 | Wiskott et al. |
| 6,408,290 B1 | 6/2002 | Thiesson et al. |
| 7,275,014 B1 | 9/2007 | Koren et al. |
| 7,490,014 B1 | 2/2009 | Koren et al. |
| 7,788,210 B2 | 8/2010 | Lang et al. |
| 7,933,915 B2 | 4/2011 | Singh et al. |
| 7,966,143 B1 | 6/2011 | Koren et al. |
| 7,990,909 B2 | 8/2011 | Brueckheimer |
| 8,086,609 B2 | 12/2011 | Goyal et al. |
| 8,396,884 B2 | 3/2013 | Singh et al. |
| 8,446,842 B2 | 5/2013 | Cao et al. |

(Continued)

FOREIGN PATENT DOCUMENTS

WO    2015143435 A1    9/2015

*Primary Examiner* — Gregory J Tryder
*Assistant Examiner* — Michael Le
(74) *Attorney, Agent, or Firm* — Martine Penilla Group, LLP

(57) ABSTRACT

Methods and systems for generating a dense graph are described. One of the methods includes receiving a graph and computing a threshold to apply to the graph. The method further includes determining whether the graph includes a first set of at least one node, determining whether a second set of at least one node from the first set meets the threshold, and removing the at least one node of the second set concurrently from the graph upon determining that the at least one node of the second set meets the threshold. The operation of removing is performed to generate an updated graph. The method includes determining whether a density of the updated graph is greater than a density of the graph and replacing the graph within the updated graph upon determining that the density of the updated graph is greater than the density of the density of the graph.

20 Claims, 19 Drawing Sheets

(56) References Cited

U.S. PATENT DOCUMENTS

| | | |
|---|---|---|
| 8,521,782 B2 | 8/2013 | Gong et al. |
| 8,862,961 B2 | 10/2014 | Zhang et al. |
| 8,922,559 B2 | 12/2014 | Charles et al. |
| 8,972,329 B2 | 3/2015 | Constantine et al. |
| 9,047,560 B2 | 6/2015 | Gunawardana et al. |
| 9,146,657 B2 | 9/2015 | Beckett et al. |
| 9,208,257 B2 | 12/2015 | Milenova et al. |
| 9,210,045 B2 | 12/2015 | Shaffer et al. |
| 2005/0180330 A1 | 8/2005 | Shapiro |
| 2006/0253570 A1 | 11/2006 | Biswas et al. |
| 2008/0091670 A1* | 4/2008 | Ismalon ............ G06F 17/3064 |
| 2008/0270605 A1* | 10/2008 | Berstis ............ G06F 9/5061 709/224 |
| 2008/0313117 A1 | 12/2008 | Galvin |
| 2008/0313137 A1 | 12/2008 | Galvin |
| 2008/0313171 A1 | 12/2008 | Galvin |
| 2010/0306158 A1* | 12/2010 | Andersen ............ G06F 17/10 706/52 |
| 2011/0016154 A1 | 1/2011 | Goyal et al. |
| 2011/0210973 A1 | 9/2011 | Di Crescenzo et al. |
| 2011/0238493 A1* | 9/2011 | Ghosh ............ G06Q 30/02 705/14.46 |
| 2011/0276266 A1* | 11/2011 | Ballew ............ G01C 21/206 701/533 |
| 2011/0282816 A1* | 11/2011 | Zhou ............ G06N 99/005 706/20 |
| 2011/0307485 A1* | 12/2011 | Udupa ............ G06Q 30/02 707/737 |
| 2012/0005238 A1* | 1/2012 | Jebara ............ G06Q 10/04 707/798 |
| 2012/0108791 A1* | 5/2012 | Dunbrack ............ C12N 9/88 530/350 |
| 2012/0197524 A1* | 8/2012 | Beyeler ............ G01C 21/3682 701/426 |
| 2013/0097125 A1* | 4/2013 | Marvasti ............ G06F 17/30943 707/692 |
| 2013/0110835 A1 | 5/2013 | He |
| 2014/0037227 A1* | 2/2014 | Zhang ............ G06K 9/6219 382/286 |
| 2014/0267292 A1 | 9/2014 | Ioffe |
| 2015/0058277 A1 | 2/2015 | Ioannidis et al. |
| 2015/0120432 A1 | 4/2015 | Wang et al. |
| 2015/0178405 A1 | 6/2015 | Hong et al. |
| 2015/0178406 A1 | 6/2015 | Hong et al. |
| 2015/0220534 A1 | 8/2015 | Constantine et al. |
| 2016/0027197 A1 | 1/2016 | Beckett et al. |

* cited by examiner

SYSTEMS AND METHODS FOR GENERATING A DENSE GRAPH

CLAIM OF PRIORITY

This application claims the benefit of and priority, under 35 U.S.C. 119§(e), to U.S. Provisional Patent Application No. 61/719,882, filed on Oct. 29, 2012, and titled "Systems and Methods for Generating a Dense Graph", which is hereby incorporated by reference in its entirety.

FIELD

The present disclosure relates generally to methods and systems for generating a dense graph.

BACKGROUND

The rapidly expanding presence of the Internet has resulted in a variety of services, such as social network services, email services, and chat services. Also, with the advancement of technology, there is an increase in biological research and services to achieve a technological breakthrough in curing a fatal or harmful disease.

These services are associated with networks. For example, the services offered via the Internet are associated with a network of computers, a network of web accounts, a network of users, or a combination thereof. As another example, the biological services are associated with a network of genes.

A variety of techniques are used to determine a group of users within the networks. For example, groups of user within chat services are categorized based on age of the users, interests of the users, or a combination thereof.

However, with time, the networks have exponentially increased to a point that it has become difficult to quickly and efficiently parse the networks.

It is in this content that various embodiments described in the present disclosure arise.

SUMMARY

The following detailed description together with the accompanying drawings will provide a better understanding of the nature and advantages of various embodiments described in the present disclosure.

In various embodiments, locally dense components of a graph are found to achieve wide-ranging applications, such as, for example community mining, spam detection, search-related indexing, search querying, finding biological networks, etc. In community mining, structure is found in large networks. For example, communities that can be leveraged to obtain graph compression are found. In finding biological networks, complex patterns of cells of a body or an organism are found. In search-related indexing, relevance of results of a search term is determined. Also, in search querying, a search result is provided in response to a search query that is made via the World Wide Web.

In some embodiments, density is used to determine a subpopulation from a population. The use of density allows to quickly and efficiently generate the subpopulation from the population. Also, in a variety of embodiments, two processors simultaneously execute various operations of the methods described herein to quickly generate a subgraph from a graph.

In several embodiments, a method for generating a dense graph is described. The method includes receiving a graph and computing a threshold to apply to the graph. The method further includes determining whether the graph includes a first set of at least one node, determining whether a second set of at least one node from the first set meets the threshold, removing the at least one node of the second set from the graph upon determining that the at least one node of the second set meets the threshold. The operation of removing is performed to generate an updated graph. The method includes determining whether a density of the updated graph is greater than a density of the graph and replacing the graph within the updated graph upon determining that the density of the updated graph is greater than the density of the density of the graph.

In various embodiments, a system for determining a subgraph within a graph is described. The system includes a memory device configured to receive the graph. The system further includes one or more processors. The one or more processors are configured to compute a threshold to apply to the graph. The threshold includes a density of the graph. The one or more processors are further configured to determine whether the graph includes a first set of at least one node, determine whether a second set of at least one node from the first set meets the threshold, and remove the at least one node of the second set from the graph upon determining that the at least one node of the second set meets the threshold. The removal is performed to generate an updated graph. The one or more processors are configured to determine whether a density of the updated graph is greater than a density of the graph, and replace the graph within the updated graph upon determining that the density of the updated graph is greater than the density of the density of the graph.

In a number of embodiments, a computer-readable medium having instructions for causing a computer to execute a method is described. The method includes receiving a graph and computing a threshold to apply to the graph. The threshold includes a density of the graph. The method further includes determining whether the graph includes a first set of at least one node, determining whether a second set of at least one node from the first set meets the threshold, and removing the at least one node of the second set from the graph upon determining that the at least one node of the second set meets the threshold, The removal is performed to generate an updated graph. The method includes determining whether a density of the updated graph is greater than a density of the graph and replacing the graph within the updated graph upon determining that the density of the updated graph is greater than the density of the density of the graph.

Other aspects will become apparent from the following detailed description, taken in conjunction with the accompanying drawings.

DETAILED DESCRIPTION

The following example embodiments and their aspects are described and illustrated in conjunction with apparatuses, methods, and systems which are meant to be illustrative examples, not limiting in scope.

Figure 1:
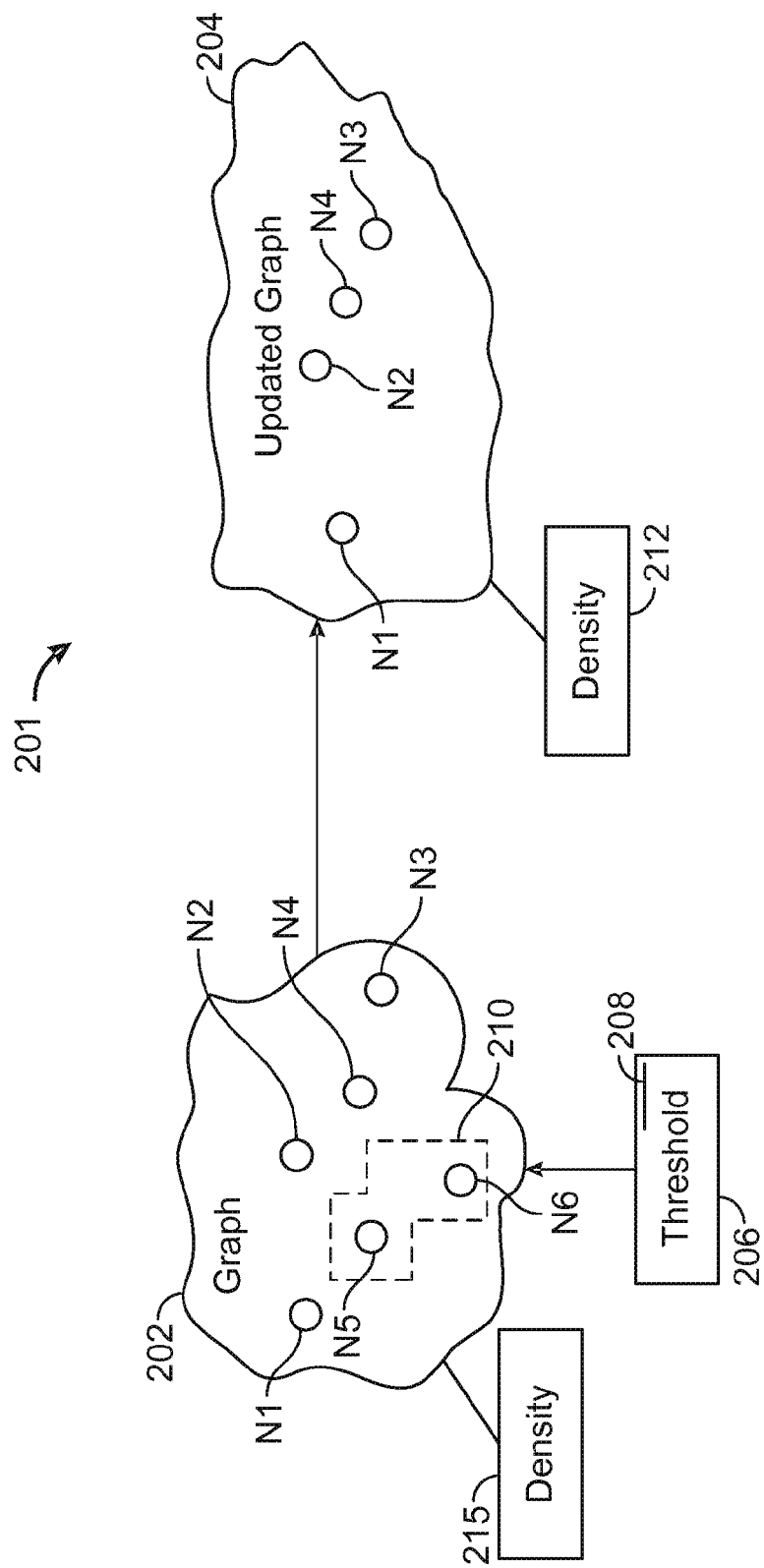
FIG. 1 is a diagram of a system that illustrates generation of an updated graph from a graph, in accordance with one embodiment described in the present disclosure.

FIG. 1 is a diagram of an embodiment of a system 201 that illustrates generation of an updated graph 204 from a graph 202. The updated graph 204 is denser compared to the graph 202.

The graph 202 includes multiple nodes N1 thru N6 of a first set. In some embodiments, the first set includes at least one node. In several embodiments, the graph 202 includes hundreds, thousands, millions, or billions of nodes. For example, a size of the graph 202 is in terabytes or petabytes.

A node of a graph represents a network node, a web account, a web page, a web site, and a gene. For example, the graph 202 represents a computer network, such as, for example a wireless network, a wired network, or a combination of a wireless network and a wired network. In this example, the computer network includes computer network nodes that are coupled with each other via electrical edges, which are electrical connections. Also, in this example, each network node may be a computer, a router, a hub, a processor, or a combination thereof. A processor, as used herein, may be an application specific integrated circuit (ASIC), a programmable logic device (PLD), a microprocessor, a controller, or a central processing unit (CPU). Examples of each electrical connection that couples two network nodes of a computer network includes a wireless link, a wired link, or a combination of a wireless link and a wired link. Examples of a wired link include a physical connection, such as, for example a wire and a coaxial cable. Examples of a wireless link include a link that communicates using a wireless protocol, which may be a Wi-Fi or Worldwide Interoperability for Microwave Access (WiMax).

In various embodiments, each network node stores web page data that is rendered to generate a webpage or a website. In a number of embodiments, each network node stores a web account of a user. A user uses the web account to access one or more World Wide Web services, such as, for example a chat service, an email service, a social network service, a search service, a maps service, or a combination thereof.

In some embodiments, a chat service or a social network service is provided by one or more servers to allow users to use multimedia, such as, for example, image, video, text, or a combination thereof, to communicate with each other via the World Wide Web. A server, as used herein, is a physical server or a virtual machine. In several embodiments, a search service is provided by one or more servers to allow a user to search for a product or service in one or more databases of the World Wide Web, to obtain information via the World Wide Web. In a variety of embodiments, a maps service is provided by one or more servers to assist a user to reach a geographic destination or to find a geographic location.

It should be noted that a service is provided when one or more servers execute an application, such as a computer program. A service is provided at a client device, such as, for example, a desktop computer, a laptop computer, a tablet, a cell phone, a smart phone, and a personal digital assistant. In various embodiments, a service is offered via one or more web pages.

As another example, the graph 202 represents a gene network, which may be a gene regulatory network. In this example, each network node includes a gene. Moreover, in this example, two network nodes are coupled with each other via a biological edge, which is a genetic connection that connect two genes. Each gene forms a part of a cell of an organism. In this example, each network node includes processing functions, such as Boolean functions, such as, for example an AND operation, an OR operation, a NOT operation, or a combination thereof. The processing functions, in this example, are performed on one or more genes that are provided as inputs to a network node to generate an output, which is a level of gene expression. To illustrate, genes are combined at a network node to produce a protein or a messenger Ribonucleic acid (mRNA). In several embodiments, the graph 202 includes hundreds, thousands, millions, or billions of edges.

A threshold 206 is applied to the graph 202. For example, it is determined whether nodes N5 and N6 of the graph satisfy the threshold 206. The nodes N5 and N6 belong to a second set 210, which is a subset of the first set of nodes N1 thru N6. In some embodiments, the second set includes at least one node. In several embodiments, the threshold 206 is determined based on a density 215 of the graph 202. The density 215 is determined based on a size of the graph 202.

Upon determining that the nodes N5 and N6 satisfy the threshold 206, the nodes N5 and N6 are not removed from the graph 202. On the other hand, upon determining that the nodes N5 and N6 do not meet the threshold 206, the nodes N5 and N6 are removed from the graph 202 to generate the updated graph 204. The updated graph 204 lacks the nodes N5 and N6 and includes the nodes N1, N2, N3, and N4. The updated graph 204 has a density 212, which is higher than the density 215.

In this manner, a portion of the graph 202 that is denser than the remaining portion of the graph 202 is identified. For example, the updated graph 204 is a portion of the graph 202 that is denser than the remaining portion of the graph 202. Such identification helps determine a type of group, such as, for example spammers, viral computer networks, a computer network malfunction, genetic disorders, etc., within the graph 202.

In several embodiments, the graph 202 includes a different number of nodes than that shown in FIG. 1.

Figure 2A:
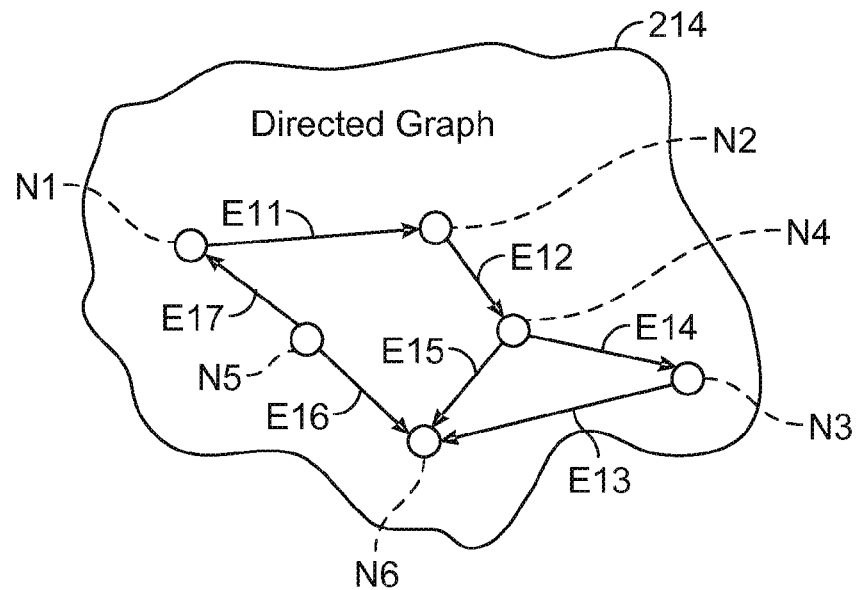
FIG. 2A is a diagram of a directed graph, in accordance with another embodiment described in the present disclosure.

FIG. 2A is a diagram of an embodiment of a directed graph 214. An example of a directed graph includes a graph that represents relationships between followers and users followed in Twitter™. The directed graph 214 is an example of the graph 202 (FIG. 1). The directed graph 214 includes directed edges E11 thru E17. For example, each directed edge indicates a restraint in communication between two nodes that are coupled with the directed edge. To further illustrate, the directed edge E11 indicates that the node N1 can communicate with node N2 and that the node N2 cannot communicate with the node N1. As another illustration, the directed edge E11 indicates that the node N2 can receive the node N1 as an input and the node N1 cannot receive the node N2 as an input. As yet another illustration, the directed edge E11 indicates that the node N1 is a web page that includes a hyperlink that can be selected by a user to access the node N2 and the node N2 is a web page that excludes a hyperlink to access the node N1.

It should be noted that if the graph 202 is a directed graph, the updated graph 204 (FIG. 1) is also a directed graph.

In various embodiments, the directed graph 214 includes a different number of edges between two nodes than that shown in FIG. 2A. For example, the edge E11 is a bidirectional edge rather than a unidirectional edge. In this example, each direction of the bidirectional edge counts as an edge. As another example, there exists another unidirectional edge (not shown) from the node N2 to the node N1.

Figure 2B:
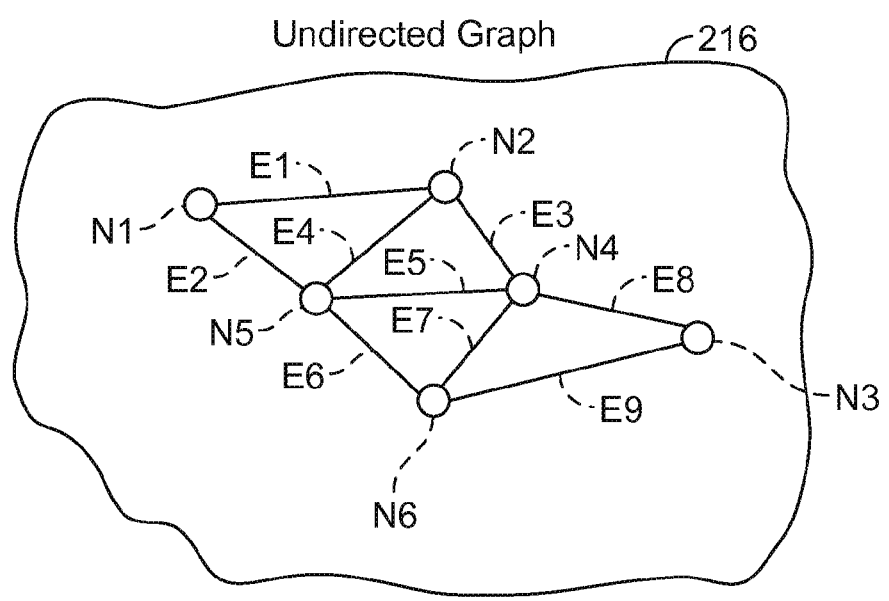
FIG. 2B is a diagram of an undirected graph, in accordance with yet another embodiment described in the present disclosure.

FIG. 2B is a diagram of an embodiment of an undirected graph 216. The undirected graph 216 is an example of the graph 202 (FIG. 1). The undirected graph 216 includes undirected edges E1 thru E9. Each undirected edge indicates a lack of restraint in communicates between two nodes that are coupled with the undirected edge. For example, the undirected edge E1 indicates that the node N1 includes a hyperlink to the node N2 and the node N2 also includes a hyperlink to the node N1. As an illustration, the undirected edge E1 indicates that the node N1 can communicate with node N2 and that the node N2 can also communicate with the node N1. As another illustration, the undirected edge E1 indicates that the node N2 can receive the node N1 as an input and the node N2 can also receive the node N2 as an input.

It should be noted that if the graph 202 is an undirected graph, the updated graph 204 (FIG. 1) is also an undirected graph. In various embodiments, the graph 202 is a weighted graph that includes weights that are assigned to edges of the graph 202.

Figure 3:
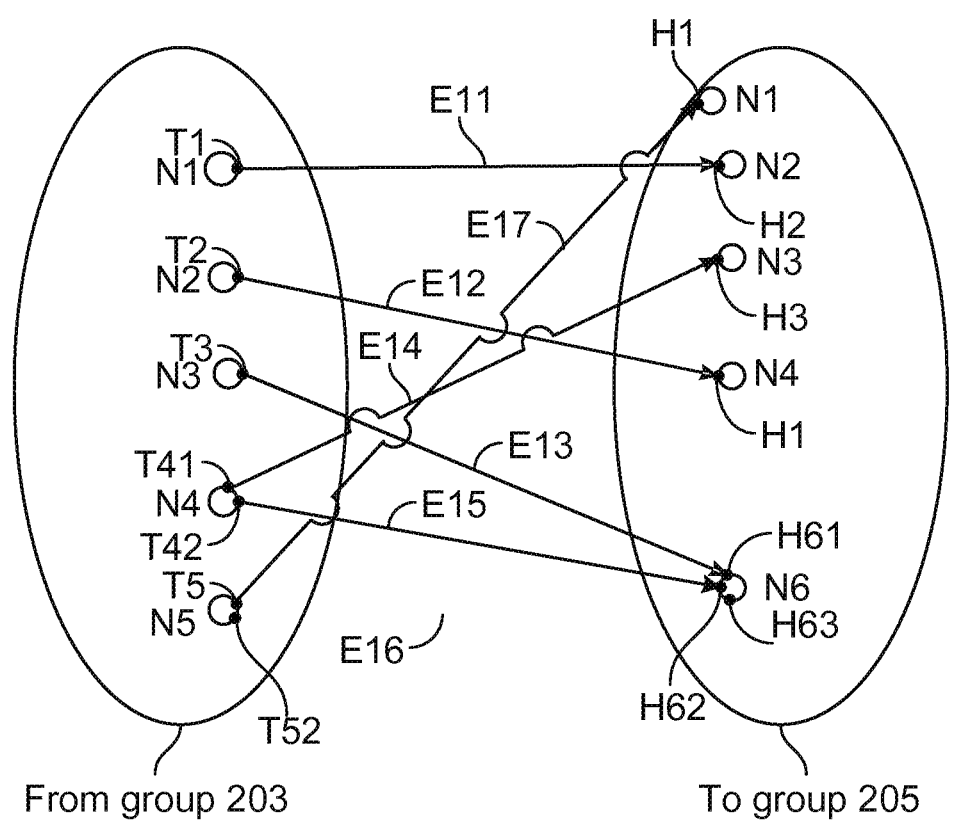
FIG. 3 is a diagram of a From group and a To group of the directed graph, in accordance with still another embodiment described in the present disclosure.

FIG. 3 is a diagram of an embodiment of a From group 203 and a To group 205 of the directed graph 214 (FIG. 2A). The From group 203 includes a group of nodes N1 thru N5 and each node N1 thru N5 is coupled with a tail endpoint that is adjacent to the node. A tail endpoint is an endpoint at a tail of a directed edge. For example, the node N1 is adjacent to a tail endpoint T1, which is an endpoint at a tail of the directed edge E11. Similarly, as other examples, the nodes N2 thru N5 are coupled with tail endpoints T2, T3, T41, T42, T51, and T52 as shown in FIG. 3. A From group excludes any head endpoints.

The To group 205 includes a group of nodes N1 thru N4 and N6 and each node N1, N2, N3, N4, and N6 is coupled with a head endpoint that adjacent to the node. A head endpoint is an endpoint at a head of a directed edge. For example, the node N1 is adjacent to a head endpoint H1, which is an endpoint at a head of the directed edge E11. Similarly, as other examples, the nodes N2, N3, N4, and N6 are coupled with head endpoints H2, H3, H4, H61, and H62 as shown in FIG. 3. A To group excludes any tail endpoints.

Figure 4A:
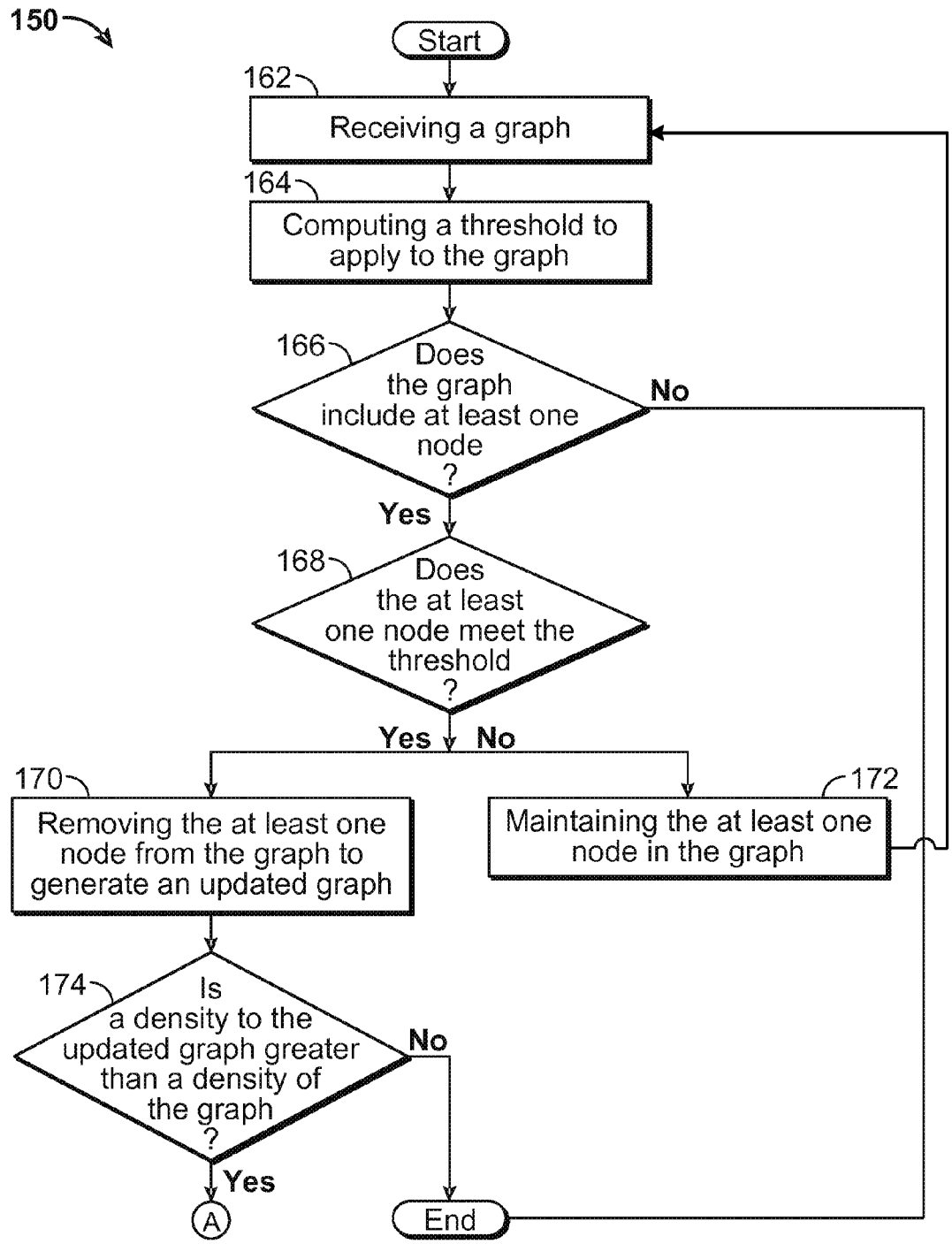
FIG. 4A is a flowchart of a method for generating the updated graph, in accordance with one embodiment described in the present disclosure.

FIG. 4A is a flowchart of an embodiment of a method 150 for generating an updated graph, such as, for example, the updated graph 204 (FIG. 1), from a graph, such as the graph 202 (FIG. 1). The method 150 is executed by one or more processors, such as one or more processors of a server.

In operation 162, a graph is received. For example, a network interface controller (NIC) of a server receives the graph 202 via a computer network, such as a local area network (LAN), a wide area network (WAN), or a combination thereof. As another example, the one or more processors of the server retrieve the graph 202 from a memory device of the server. A memory device may be a random access memory (RAM), a read-only memory (ROM), or a combination thereof. Examples of a memory device includes a flash memory, a hard disk, and a disk array. A LAN may be a wired LAN or a wireless LAN, or a combination thereof. A WAN may be a wired LAN or a wireless LAN, or a combination thereof.

In an operation 164, a threshold to apply to the graph received in operation 162 is computed. For example, the threshold 206 (FIG. 1) to apply to the graph 202 is calculated. In several embodiments, a threshold is calculated as a multiple of a density of the graph received in operation 162. For example, the threshold 206 is a multiple of the density 215 (FIG. 1). As another example, if the graph 202 is the undirected graph 216, the threshold 206 is a result of the following equation:

$$m(1+\epsilon)\rho(S) \qquad \text{eq. (1)}$$

where m is a positive rational number, such as ranging between 1 and 3, $\epsilon$ is a positive rational number, and $\rho$ is a density of a graph S. In some embodiments, m is equal to 2. By using the threshold provided in equation (1), a density of the updated graph 204 within an m(1+$\epsilon$) approximation of an optimum density is achieved. The undirected graph 216 is an example of the graph S.

For the undirected graph 216 (FIG. 2B), a density of the undirected graph 216 is equal to a ratio of size of the edges E1-E9 within the undirected graph 216 to a size of nodes N1-N6 in the undirected graph 216. The size of the edges E1 thru E9 is a number, such as, for example nine, of the edges. Moreover, the size of the nodes N1 thru N6 is a number, such as, for example six, of the nodes N1 thru N6. If the graph 202 is a weighted undirected graph, the density of the graph 202 is:

$$\sum_e \frac{|E(S)|w_e}{|S|} \qquad \text{eq. (2)}$$

where $w_e$ is a weight assigned to each edge of the graph 202, e is a number of edges within the graph 202, |S| is a size of the nodes in the graph 202, and |E(S)| is a size of edges within the graph 202. The weights $w_e$ are assigned by one or more processors of a server.

As yet another example, if the graph 202 is the directed graph 214, the threshold 206 that corresponds to the From group 203 is a result of the following equation:

$$(1+\varepsilon)\frac{|E(F, T)|}{|F|} \qquad \text{eq. (3)}$$

where F represents the From group 203, T represents the To group 205, |F| is a size of the From group 203, and |E(F,T)| is a size of edges between the groups 203 and 205. A size of the From group 203 is equal to a number, such as, for example five, of nodes within the group. Also, a size of edges between the From and To groups 203 and 205 is equal to a number, such as, for example seven, of edges E11 thru E17 between the groups 203 and 205.

As another example, if the graph 202 is the directed graph 214, the threshold 206 that corresponds to the To group 205 is a result of the following equation:

$$(1+\varepsilon)\frac{|E(F, T)|}{|T|} \qquad \text{eq. (4)}$$

where |T| is a size of the To group 205. A size of the To group 205 is equal to a number, such as, for example five, of nodes within the group 205.

If the graph 202 is the directed graph 214 (FIG. 2A), a density of the directed graph 214 is equal to a ratio of a size of edges E11 thru E17 between the From and To groups 203 and 205 of the directed graph 214 to a size of a geometric mean, such as, for example a square root of a product, of sizes of nodes within the From and To groups 203 and 205 (FIG. 3). For example, the density of the directed graph 214 is equal to $$\rho(F, T) = \frac{|E(F, T)|}{\sqrt{|F||T|}} \qquad \text{eq. (5)}$$

In an operation 166, it is determined whether the graph received at operation 162 includes at least one node. For example, if the graph 202 is the undirected graph 216 (FIG. 2B), it is determined whether the graph 202 includes one or more nodes. As another example, if the graph 202 is the directed graph 214 (FIG. 2A), it is determined whether the From group 203 includes at least one node and the To group 205 includes at least one node.

Upon determining that the graph received at operation 162 does not include at least one node, the method 150 ends. For example, upon determining that the undirected graph 216 does not include at least one node, the method 150 ends. As another example, upon determining that the From group 203 does not include at least one node or the To group 205 does not include at least one node, the method 150 ends.

On the other hand, in response to determining that the graph received at operation 162 includes at least one node, in an operation 168, if the graph 202 is the undirected graph 216, it is determined whether the at least one node of the second set 210 of the graph received at operation 162 meets the threshold that is calculated in the operation 164.

If the graph 202 is the directed graph 214, an additional operation (not shown) is performed in response to determining that the graph received at the operation 162 includes at least one node. The additional operation is performed between the operations 162 and 168. For example, the additional operation includes determining whether a ratio of a size of nodes within the From group 203 and a size of nodes within the To group 205 is greater than a positive rational number c.

In several embodiments, a server that executes the method 150 includes two or more processors that executed the method 150. For example, a first processor of the server determines whether the node N5 meets the threshold 206 in parallel with a determination by a second processor of the server. The determination by the second processor includes determining whether the node N6 meets the threshold 206. For example, the first processor determines whether a degree of the node N5 meets the threshold 206 and the second processor concurrently determines whether a degree of the node N6 meets the threshold 206. In this example, the first processor calculates the degree of the node N5 simultaneous with calculation of the degree of the node N6 by the second processor.

In various embodiments in which the graph 202 is the undirected graph 216, a degree of a node of the undirected graph 216 is equal to a number of end points adjacent to the node. For example, a degree of the node N5 of the undirected graph 216 (FIG. 2B) is equal to four. The node N5 of the undirected graph 216 is adjacent to four end points, a first one of the end points is coupled with the node N1, a second one of the end points is coupled with the node N2, a third one of the end points is coupled with the node N4, and a fourth one of the end points is coupled with the node N6.

Moreover, in these embodiments in which the graph 202 is the undirected graph 216, the first processor determines whether the degree of the node N5 of the undirected graph 216 is less than or equal to the threshold $m(1+\epsilon)\rho(S)$ of equation (1). Moreover, in this example, the second processor determines whether a degree of the node N6 of the undirected graph 216 is less than or equal to the threshold $m(1+\epsilon)\rho(S)$ of equation (1). In several embodiments, the determinations of whether the degree of the node N5 of the undirected graph 216 is less than or equal to the threshold $m(1+\epsilon)\rho(S)$ and whether the degree of the node N6 of the undirected graph 216 is less than or equal to the threshold $m(1+\epsilon)\rho(S)$ are made simultaneously by the first and second processors.

Also, in various embodiments in which the graph 202 is the directed graph 214, the node N5 is included within the From group 203 and the node N6 is included within the To group 205. Moreover, in these embodiments, if the ratio of the size of nodes within the From group 203 and the size of nodes within the To group 205 is greater than or equal to the rational number c, the first processor determines whether an outdegree of the node N5 of the From group 203 is less than or equal to the threshold 206 of equation (3). Also, in these embodiments, if the ratio of the size of nodes within the From group 203 and the size of nodes within the To group 205 is less than the rational number c, the second processor determines whether an indegree of the node N6 of the To group 205 less than or equal to the threshold 206 of equation (4). In several embodiments, both the determinations are made simultaneously by the first and second processors. It should be noted that the equation (3) is applied if a node to which the operation 168 is applied belongs to the From group 203 and the equation (4) is applied if a node to which the operation 168 is applied belongs to the To group 205.

In response to determining that the at least one node of the graph 202 does not meet the threshold, in an operation 172, the at least one node is maintained within the graph 202. For example, in the embodiments in which the graph 202 includes the undirected graph 216, the two or more nodes N5 and N6 of the second set 210 are maintained within the undirected graph 216 if it is determined that the degree of the node N5 is greater than the threshold $m(1+\epsilon)\rho(S)$ of equation (1) and that the degree of the node N6 is greater than the threshold $m(1+\epsilon)\rho(S)$ of equation (1). As another example, the node N5 is maintained within the From group 203 if the outdegree of the node N5 of the From group 203 is greater than the threshold 206 of equation (3) and the node N6 is maintained within the To group 205 if the indegree of the node N6 is greater than the threshold 206 of equation (4).

Upon determining that the at least one node of the graph 202 meets the threshold 206, in an operation 170, the at least one node is removed from the graph 202 to generate the updated graph 204. As an example, the first processor deletes the node N5 from the undirected graph 216 while the second processor deletes the node N6 from undirected graph 216 upon determining that the degree of the node N5 is less than or equal to the threshold of equation (1) and that the degree of the node N6 is less than or equal to the threshold of equation (1). In this example, the first and second processors delete the nodes N5 and N6 concurrently. As another example, the first processor deletes the node N5 from the From group 203 upon determining that the outdegree of the node N5 of the From group 203 is less than or equal to the threshold 206 of equation (3) and the second processor deletes the node N6 from the To group 205 upon determining that the indegree of the node N6 of the To group 205 is less than or equal to the threshold 206 of equation (4).

If the updated graph 204 is a directed graph, a density of the directed graph is equal to a ratio of a size of edges E11, E12, and E14 between From and To groups of the updated graph 204 to a size of a geometric mean, such as, for example a square root, of sizes of nodes within the From and To groups. For example, the density of the directed updated graph is equal to $$\rho(F_u, T_u) = \frac{|E(F_u, T_u)|}{\sqrt{|F_u||T_u|}} \qquad \text{eq. (6)}$$

where $F_u$ represents the From group of the directed updated graph, $T_u$ represents the To group of the directed updated graph, $|F_u|$ is a size of the From group, $|T_u|$ is a size of the To group, and $|E(F_u, T_u)|$ is a size of edges between the From and To groups.

In an operation 174, it is determined whether a density of the updated graph 204 is greater than a density of the graph 202. For example, if the graph 202 is the undirected graph 216 (FIG. 2B), it is determined whether a ratio of a number of edges between pairs of nodes remaining in the updated graph 204 to a number of the nodes is greater than a ratio of edges between pairs of nodes of the graph 202 to a number of nodes of the graph 202. As another example, if the graph 202 is the directed graph 214 (FIG. 2A), it is determined whether a ratio of a number of remaining edges between a From group of the updated graph 204 and a To group of the updated graph 204 to a geometric mean of a product of a size of the From group and a size of the To group is greater than a ratio of a number of edges of the From group 202 and the To group 205 to a geometric mean of a product of a size of the From group 202 and a size of the To group 205.

The density of the updated graph 204 is calculated in a similar manner to that of calculation of density of the graph 202. For example, if the updated graph 204 is an undirected graph, a density of the undirected graph is equal to a ratio of size of edges E1, E3, and E8 remaining in the undirected graph to a size of nodes N1-N4 remaining in the undirected graph. Upon determining that the density of the updated graph 204 is not greater than the density of the graph 202, the method 150 ends.

Figure 4B:
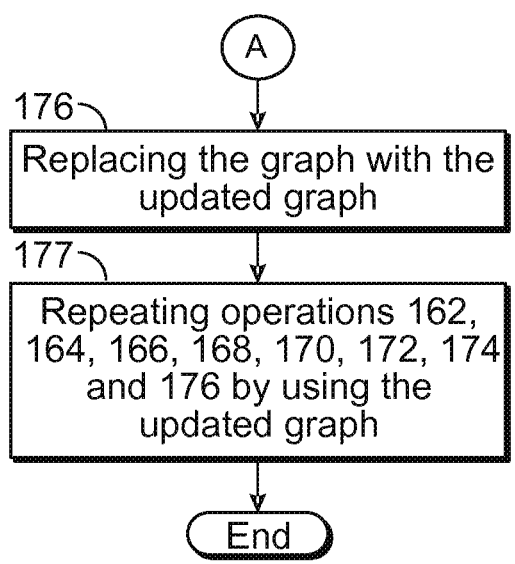
FIG. 4B is a continuation of the flowchart of FIG. 4A, in accordance with one embodiment described in the present disclosure.

FIG. 4B is a continuation of the flowchart of FIG. 4A. Upon determining that the density of the updated graph 204 is greater than the density of the graph 202, in an operation 176, the graph 202 is replaced with the updated graph 204.

Moreover, in an operation 177, an additional iteration of the method 150 is performed with respect to the updated graph 204 instead of the graph 202. In the operation 177, the operations 162, 164, 166, 168, 170, 172, 174, and 176 are repeated with respect to the updated graph 204 instead of the graph 202. For example, if the updated graph 204 is an undirected graph, one or more processors of the server calculate a threshold to apply to the updated graph 204 by applying the equation (1) to the updated graph 204 instead of the graph 202. To illustrate, the following equation (7) is applied to the updated graph 204:

$$m(1+\epsilon)\epsilon(S_u) \qquad \text{eq. (7)}$$

where $\rho(S_u)$ is a density of an updated graph $S_u$. The updated graph 204 is an example of the graph $S_u$. As another example, if the updated graph 204 is a directed graph, one or more processors of the server calculate a threshold to apply to the From group of the updated graph 204 by applying the equation (3) to the From group of the updated graph 204 instead of to the From group 203 (FIG. 3). To illustrate, the following equation (8) is applied to the From group of the updated graph 204:

$$(1+\varepsilon)\frac{|E(F_u, T_u)|}{|F_u|} \qquad \text{eq. (8)}$$

Also, in this example, one or more processors of the server calculate a threshold to apply to the To group of the updated graph 204 by applying the equation (4) to the To group of the updated graph 204 instead of to the To group 205 (FIG. 3). To illustrate, the following equation (9) is applied to the To group of the updated graph 204:

$$(1+\varepsilon)\frac{|E(F_u, T_u)|}{|T_u|} \qquad \text{eq. (9)}$$

where $|T_u|$ is a size of the To group of the updated graph $S_u$.

As another example, in the operation 170, at least one node is removed from the updated graph 204. For example, two or more nodes are removed concurrently from the updated graph 204 rather than from the graph 202. The two or more nodes of the updated graph 204 are removed to generate an additional updated graph (not shown). As yet another example, in the operation 174, it is determined whether a density of the additional updated graph is greater than the density of the updated graph 204 instead of determining whether the density of the updated graph 204 is greater than the density of the graph 202. As another example, in the operation 176, the updated graph 204 is replaced with the additional updated graph instead of replacing the graph 202 with the updated graph 204. The method 150 ends after the operation 177.

It should be noted that in various embodiments in which the graph 202 is the undirected graph 216 or the directed graph 214, the method 150 ends in a number of iterations and the number is equal to $\log_{1+\epsilon} n$, where n is a positive rational number. For a small value of $\epsilon$, $\log(1+\epsilon)$ is approximately the same as $\epsilon$ and a number of iterations of the method 150 for the undirected graph 216 is a function of $$\frac{\log n}{\epsilon}.$$

In several embodiments in which the graph 202 is the undirected graph 216, to achieve the $m(1+\epsilon)$ approximation, a number of iterations of the method 150 is a function of k/log k, where k is a function of log n. Moreover, in these embodiments, an amount of memory space of one or more memory devices used to store the graph 202 is a function of $n/(m^2p)$, where p is a number of iterations of the method 150. In these embodiments, edges and nodes of the graph 202 are streamed from the one or more memory devices to a processor of a server for processing.

In a number of embodiments in which the graph 202 is weighted and undirected, a number of iterations of the method 150 is equal to a function of log n and a memory space of one or more memory devices used to store the graph 202 is a function of n/log n. In these embodiments, edges and nodes of the graph 202 are streamed from the one or more memory devices to a processor of a server for processing.

In various embodiments, a number of iterations of the method 150 are less than 10 to achieve a desirable density.

In several embodiments in which the graph 202 is the directed graph 214, in the operation 177, in addition to the operations 162, 164, 166, 168, 170, 172, 174, 176, and 177, the additional operation is repeated with respect to the updated graph 204 instead of the graph 202.

Figure 5:
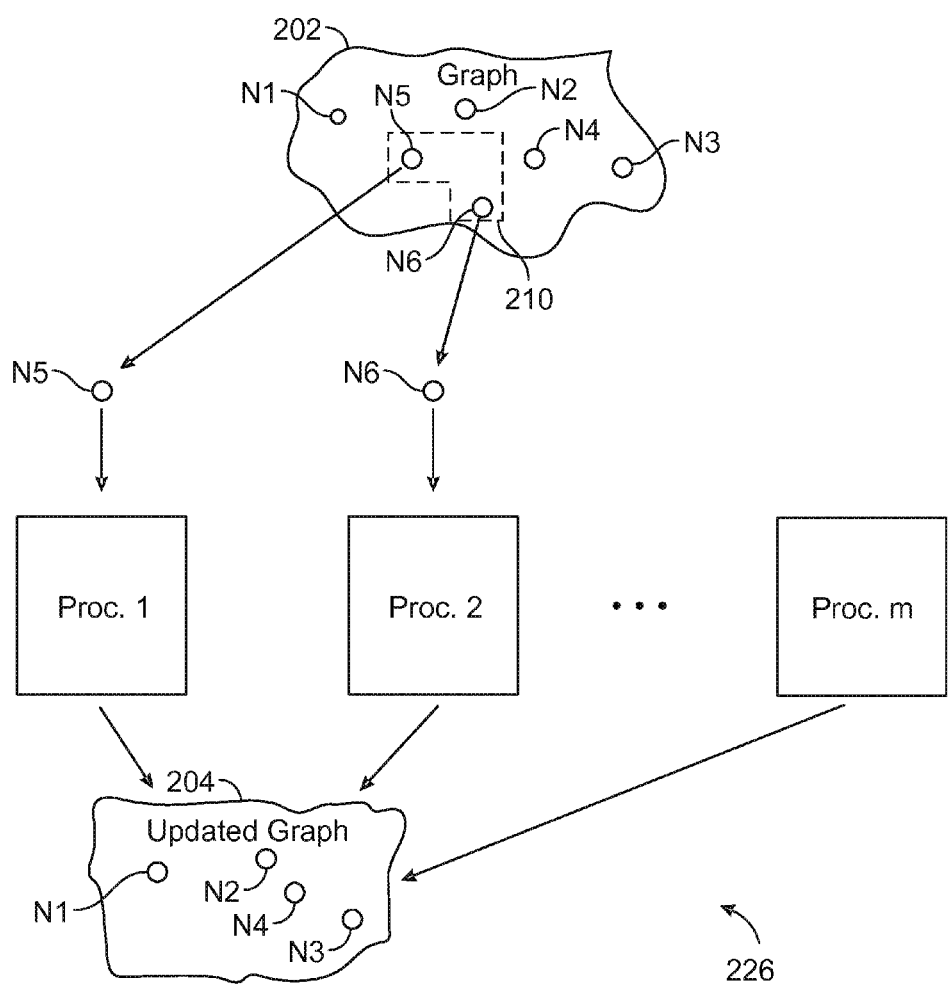
FIG. 5 is a diagram of a system that includes multiple processors for executing various embodiments of the methods described herein, in accordance with one embodiment described in the present disclosure.

FIG. 5 is a diagram of an embodiment of a system 226 that includes multiple processors P1 thru Pm, where m is an integer greater than one. For example, the processors P1 thru Pm are processors of the server that executed the method 150 (FIGS. 4A and 4B). In several embodiments, the processors 1 and 2 perform the method 150 or another method 236, which is described below, on the nodes of the graph 202 in a distributed and parallel fashion. For example, the processors 1 and 2 simultaneously delete the nodes N5 and N6 of the graph 202 from one or more memory devices to generate the updated graph 204. In this example, the node N5 is stored in a memory device and the node N6 is stored in another memory device. Also, in this example, none of the memory devices have memory space that is capable of storing the graph 202. Each of the memory device has memory space that is capable of storing a portion of the graph 202. In some embodiments, the one or more memory devices are part of the server. In various embodiments, the one or more memory devices are located within another server or are standalone memory devices.

In some embodiments, the processors 1 and 2 perform the operation 168 (FIG. 4A) to concurrently determine whether the nodes N5 and N6 of the second set 210 meet the threshold.

In other embodiments, the processor 1 processes all nodes of the graph 202 in an ordered fashion. For example, the processor 1 applies the method 150 or the method 236 to the node 1, sequentially applies the method 150 or 236 to the node 2, and so on until the method 150 or 236 is applied to all nodes of the graph 202. As another example, the processor 1 deletes the node N5 from the one or more memory devices and sequentially deletes the node N6 from the one or more memory devices. In these embodiments, the nodes and edges of the graph 202 are streamed from one or more memory devices towards the processor 1. For example, in these embodiments, a size of a memory device that stores the nodes and edges of the graph 202 is a function, such as a multiple, of a number of the nodes and edges. To illustrate, if the nodes and edges of the graph 202 consume a memory space of 10 petabytes, a memory device that stores the graph 202 is a multiple of 10 petabytes.

In the embodiments in which the nodes and edges of the graph 202 are streamed from one or more memory devices towards the processor 1, a size of each memory device is a function of n/log n to execute a number of iterations of the method 150 or 236. The number of iterations is a function of log n.

It should be noted that some embodiments presented herein are described with respect to two nodes N5 and N6. However, in a variety of embodiments, instead of the two nodes N5 and N6, more than two nodes of the graph 202 can be simultaneously processed by the processors 1 thru m to execute the method 150.

Figure 6:
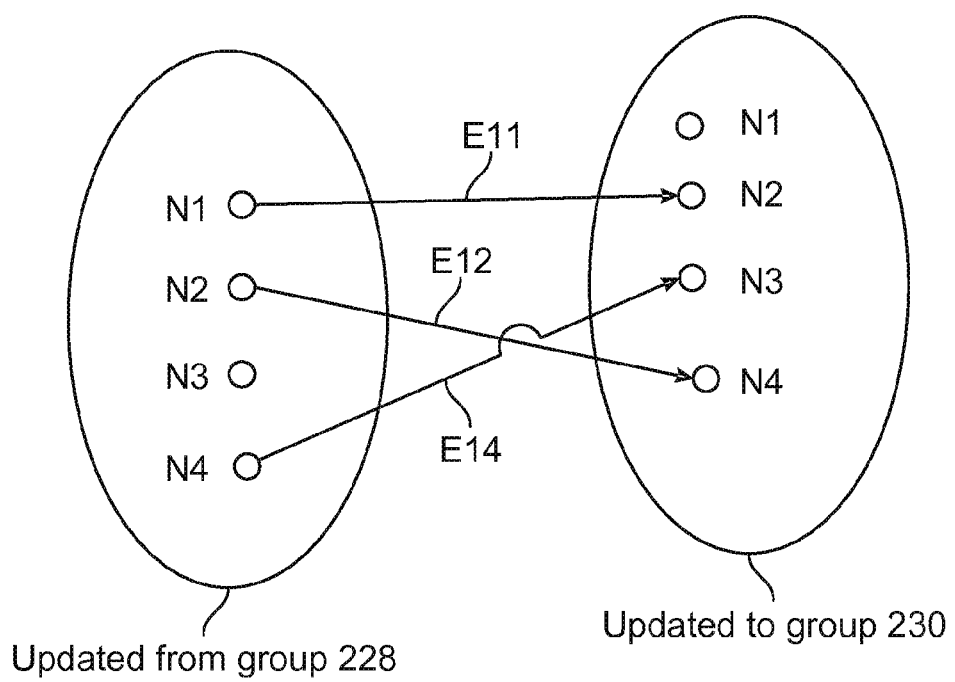
FIG. 6 is a diagram of a From group of the updated graph and a To group of the updated graph, in accordance with one embodiment described in the present disclosure.

FIG. 6 is a diagram of an embodiment of the From group of the updated graph 204 (FIG. 1) and the To group of the updated graph 204. The From group of the updated graph 204 is illustrated as an updated From group 228 and the To group of the updated graph 204 is illustrated as an updated To group 230.

The updated From group 228 is formed upon removal of the node N5 from the From group 203 (FIG. 3). Moreover, the updated To group 230 is formed upon removal of the node N6 from the To group 205 (FIG. 3). In some embodiments, the processor 1 removes the node N5 from the From group 203 simultaneous with removal of the node N6 from the To group 205. In several embodiments, the processor 1 removes the node N5 from the From group 203 first and thereafter, such as, for example, sequentially, removes the node N6 from the To group 205.

It should further be noted that the From group 203 is replaced with the updated From group 228 and the To group 205 is replaced with the updated To group 230 to replace the graph 202 (FIG. 1) with the updated graph 204 (FIG. 1).

Figure 7A:
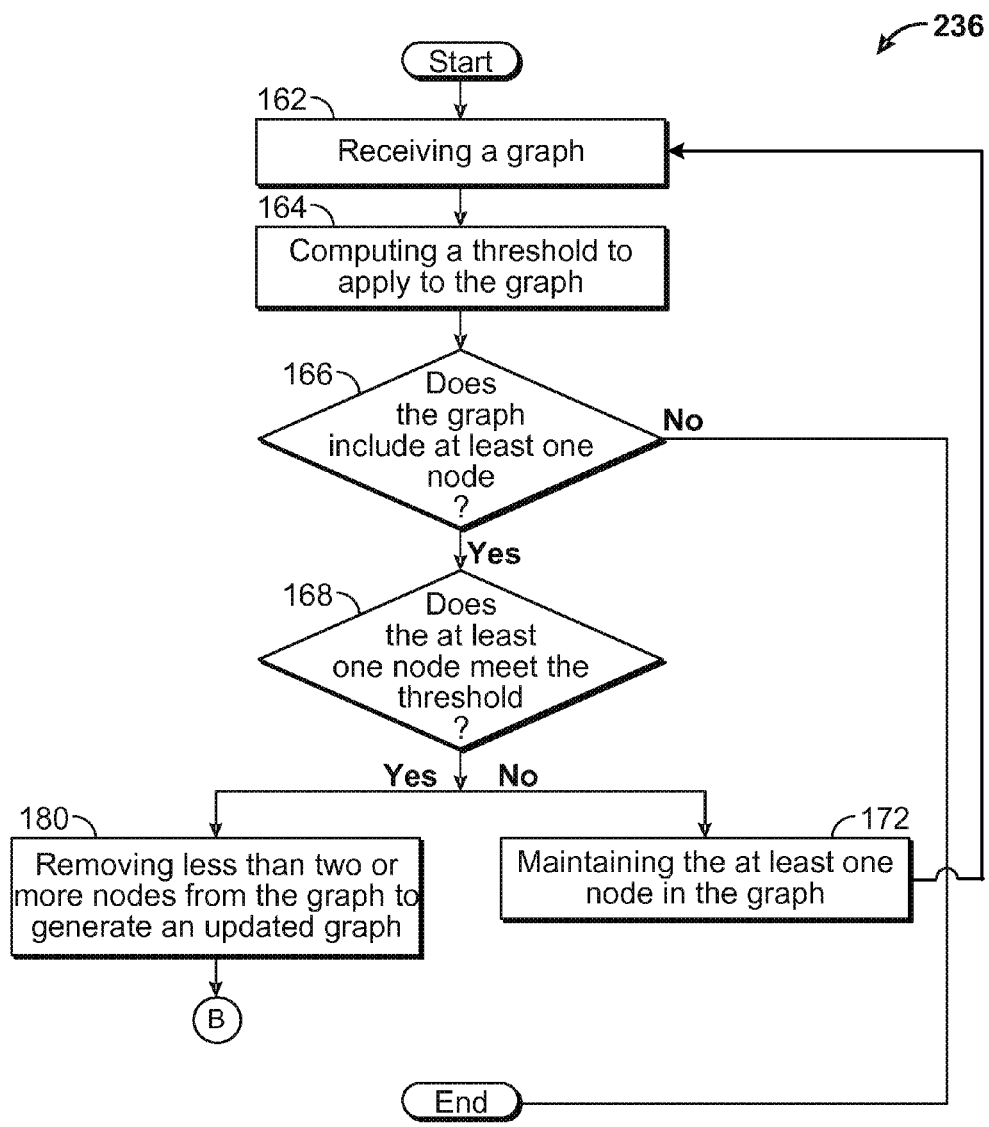
FIG. 7A is a flowchart another method for generating the updated graph, in accordance with one embodiment described in the present disclosure.
Figure 7B:
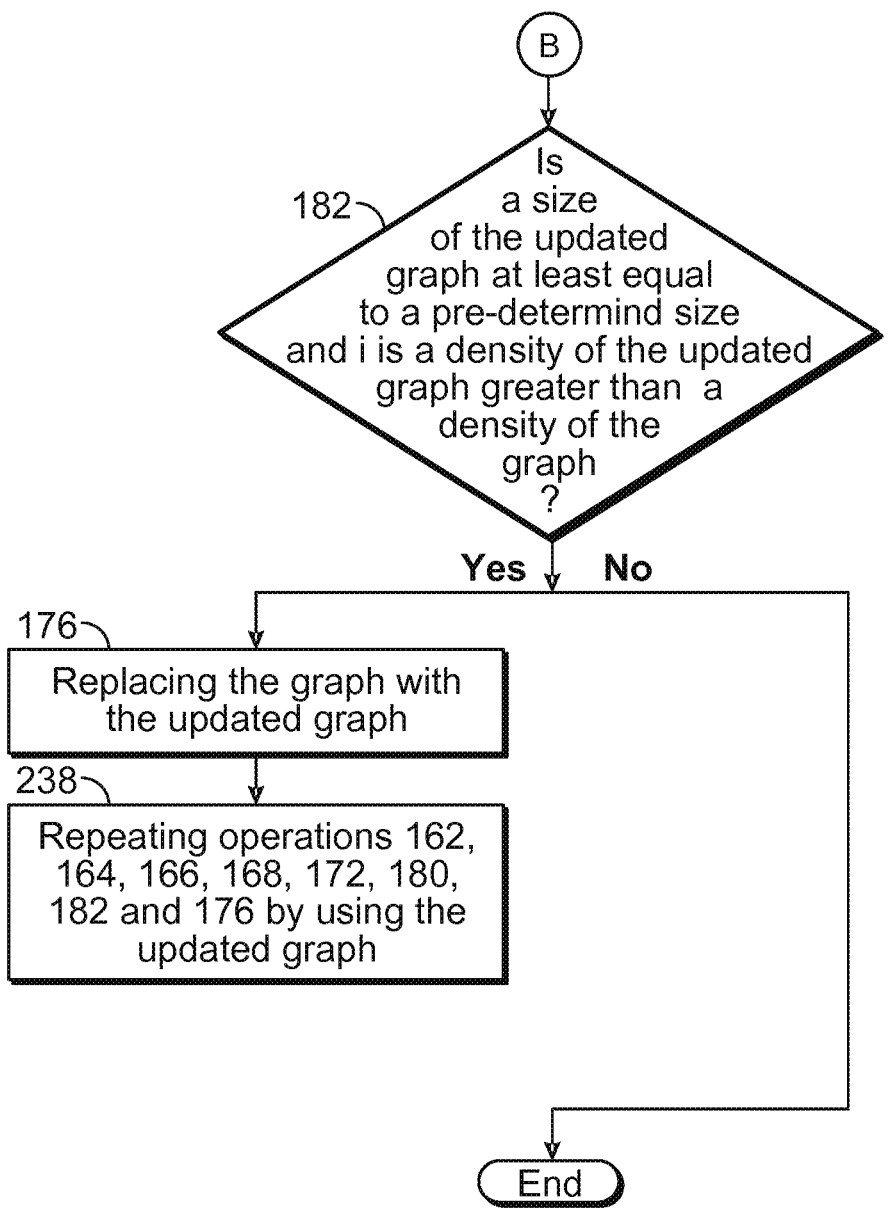
FIG. 7B is a continuation of the flowchart of FIG. 7A, in accordance with another embodiment described in the present disclosure.

FIG. 7A is a flowchart of an embodiment of the method 236 for generating an updated graph from the graph 202 (FIG. 1). The method 236 is executed by one or more processors of a server.

The method 236 is similar to the method 150 except that the method 236 includes operations 180, 182, and 238. In the method 236, the operations 162, 164, 166, 168, and 172 are performed. Moreover, upon determining that two or more nodes of the second set 210 (FIG. 1) of the graph 202 meet the threshold, in the operation 180, a number of nodes less than the two or more nodes is removed from the graph 202 to generate an updated graph. For example, a constant fraction of the two or more modes of the second set 210 of the graph 202 is removed concurrently from the graph 202. As an example, the constant fraction is:

$$\frac{\varepsilon}{1+\varepsilon} \qquad \text{eq. (10)}$$

In the operation 182, it is determined whether a size of the updated graph that is generated in the operation 180 is at least equal to a pre-determined size and whether a density of the updated graph is greater than a density of the graph 202. The determination of whether the density of the updated graph that is generated in the operation 180 is greater than the density of the graph 202 is made in a manner similar to that of the determination in the operation 174 (FIG. 4A) of whether the density of the updated graph 204 (FIG. 1) is greater than the density of the graph 202. An example of the pre-determined size includes an integer greater than zero. The pre-determined size is stored in a memory device of a server. An example of the size of the updated graph that is generated in the operation 180 is a number of nodes of the updated graph.

Upon determining that the size of the updated graph that is generated in the operation 180 is less than the pre-determined size or that the density of the updated graph is not greater than the density of the graph 202, the method 236 ends. On the other hand, upon determining that the size of the updated graph that is generated in the operation 180 is at least equal to the pre-determined size and that the density of the updated graph is greater than the density of the graph 202, the operation 176 is performed with respect to the updated graph that is generated in the operation 180. For example, the graph 202 is replaced with the updated graph that is generated in the operation 180. Moreover, in an operation 238, the operations 162, 164, 166, 168, 172, 180, 182, and 176 are performed using the updated graph that is generated in the operation 180 instead of the graph 202. The operations 162, 164, 166, 168, 172, 180, 182, and 176 are repeated in the operation 238 to execution another iteration of the method 236.

It should be noted that in various embodiments in which the graph 202 is the undirected graph 216, the method 236 ends in a number of iterations and the number is a function of $\log_{1+\varepsilon} n/k$.

Several embodiments are described using one or more processors of a server. In a variety of embodiments, instead of one or more processors of a server, one or more processors of a client device or a combination of one or more processors of the server and one or more processors of the client device is used. For example, the method 150 of FIGS. 3A and 3B is executed by a combination of one or more processors of a server and one or more processors of a client device. As another example, the method 236 is executed by one or more processors of a client device instead of one or more processors of a server.

Although the method operations were described in a specific order in the flowcharts of FIGS. 4A, 4B, 7A, and 7B, it should be understood that some operations may be performed in a different order, when the order of the operations do not affect the expected results. In addition, other operations may be included in the methods 150 and 236 presented, and the operations may be performed by different entities in a distributed fashion, as long as the processing of the operations is performed in a desired way.

In addition, at least one operation of the methods 150 and 236 performs physical manipulation of physical quantities, and some of the operations described herein are useful machine operations. Embodiments presented herein recite a device or apparatus. The apparatus is specially constructed for a purpose. The apparatus includes a processor capable of executing the program instructions of the computer programs presented herein.

In various embodiments, a number of iterations of the method 236 are less than 10 to achieve a desirable density.

In several embodiments in which the graph 202 is the directed graph 214, in the operation 238, in addition to the operations 162, 164, 166, 168, 172, 180, 182, and 176, the additional operation is repeated with respect to the updated graph 204 instead of the graph 202.

Figure 8:
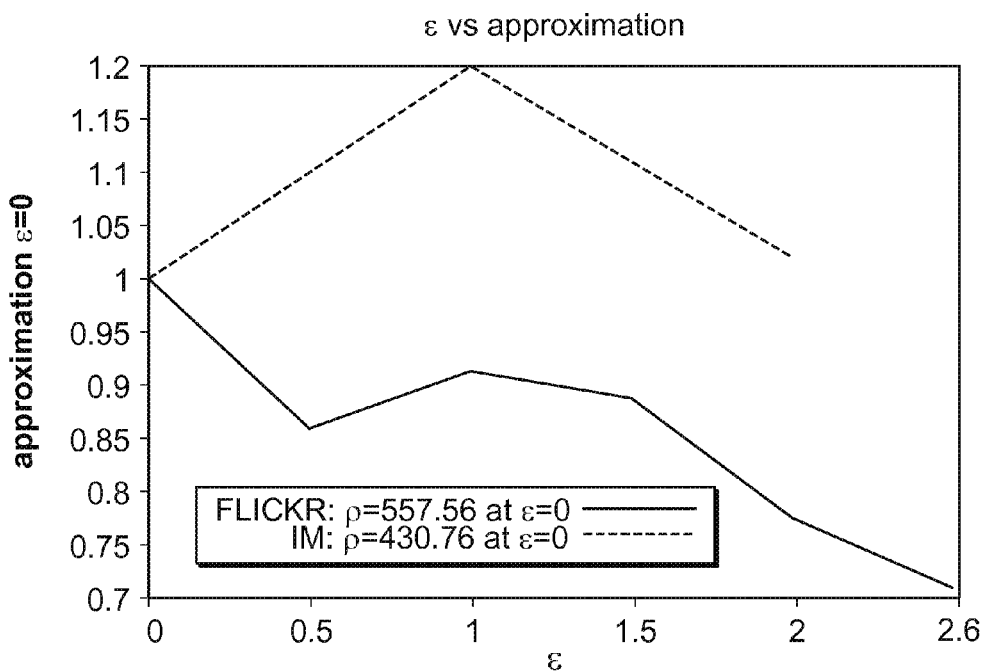
FIG. 8 is a graph that plots an approximation for the undirected graph versus values of a rational number $\epsilon$ for two services, in accordance with another embodiment described in the present disclosure.

FIG. 8 is an embodiment of a graph that plots the $m(1+\varepsilon)$ approximation for the undirected graph 216 (FIG. 2B) on a y-axis with respect to values of $\varepsilon$ on an x-axis for two services, Flickr™ and instant messenger (IM) service. The Flickr™ service is a photo management and sharing service. The IM service is provided by Yahoo™ Corporation of Sunnyvale, Calif. It should be noted that the $m(1+\varepsilon)$ approximation does not deteriorate for higher values of $\varepsilon$.

Figure 9:
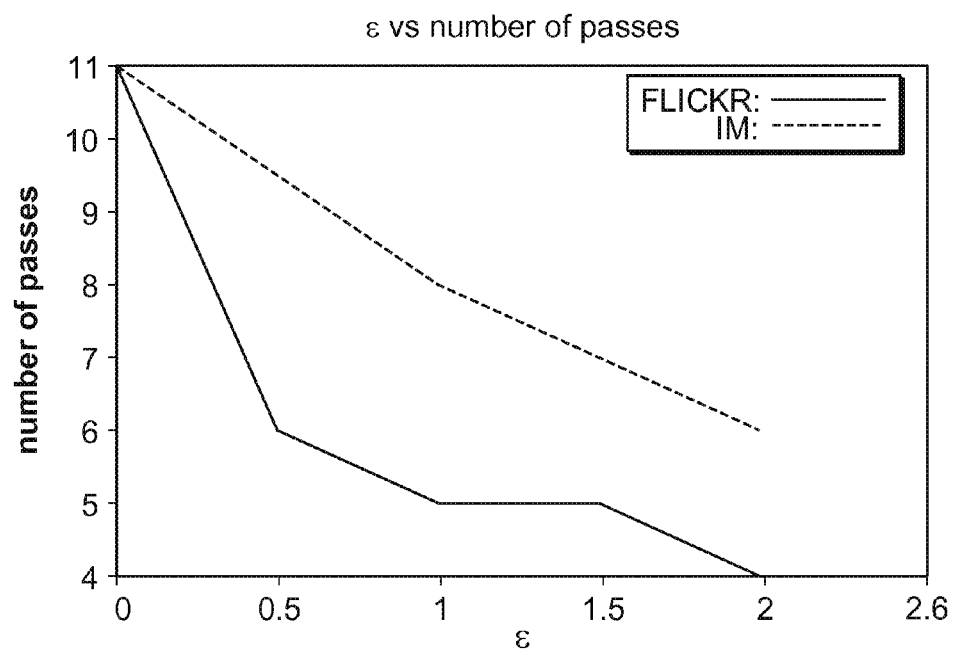
FIG. 9 is a graph that plots a number of iterations of the method of FIGS. 4A and 4B or the method of FIGS. 7A and 7B for the undirected graph versus values of $\epsilon$ for the two services, in accordance with yet another embodiment described in the present disclosure.

FIG. 9 is an embodiment of a graph that plots a number of iterations, which are passes, of the method 150 or 236 for the undirected graph 216 (FIG. 2B) on a y-axis versus values of $\varepsilon$ on an x-axis for the two services, Flickr™ and IM.

Figure 10:
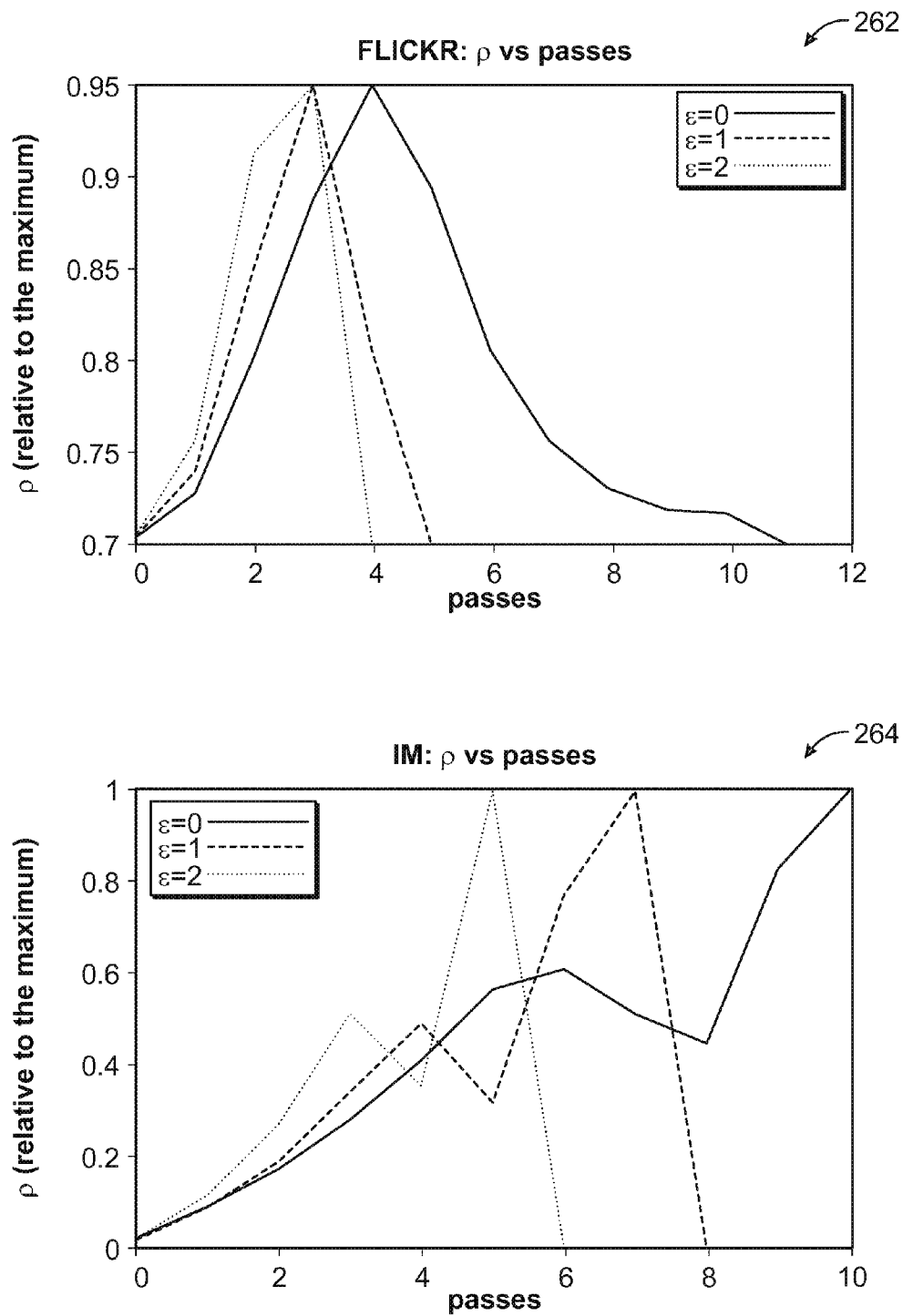
FIG. 10 shows graphs that plot relative densities versus number of iterations of the method of FIGS. 4A and 4B or the method of FIGS. 7A and 7B for the undirected graph, in accordance with still another embodiment described in the present disclosure.

FIG. 10 is an embodiment of a graph 262 that plots a relative density versus a number of iterations of the method 150 or 236 for the undirected graph 216 (FIG. 2B). The graph 262 is plotted for the Flickr™ service. As an example, the relative density is a density of the graph 202 or 204 compared to a maximum between the density of the graph 202 and the updated graph 204.

Also shown in FIG. 10 is an embodiment of a graph 264 that plots a relative density versus a number of iterations of the method 150 or 236 for the undirected graph 216. The graph 264 is plotted for the IM service.

Figure 11A:
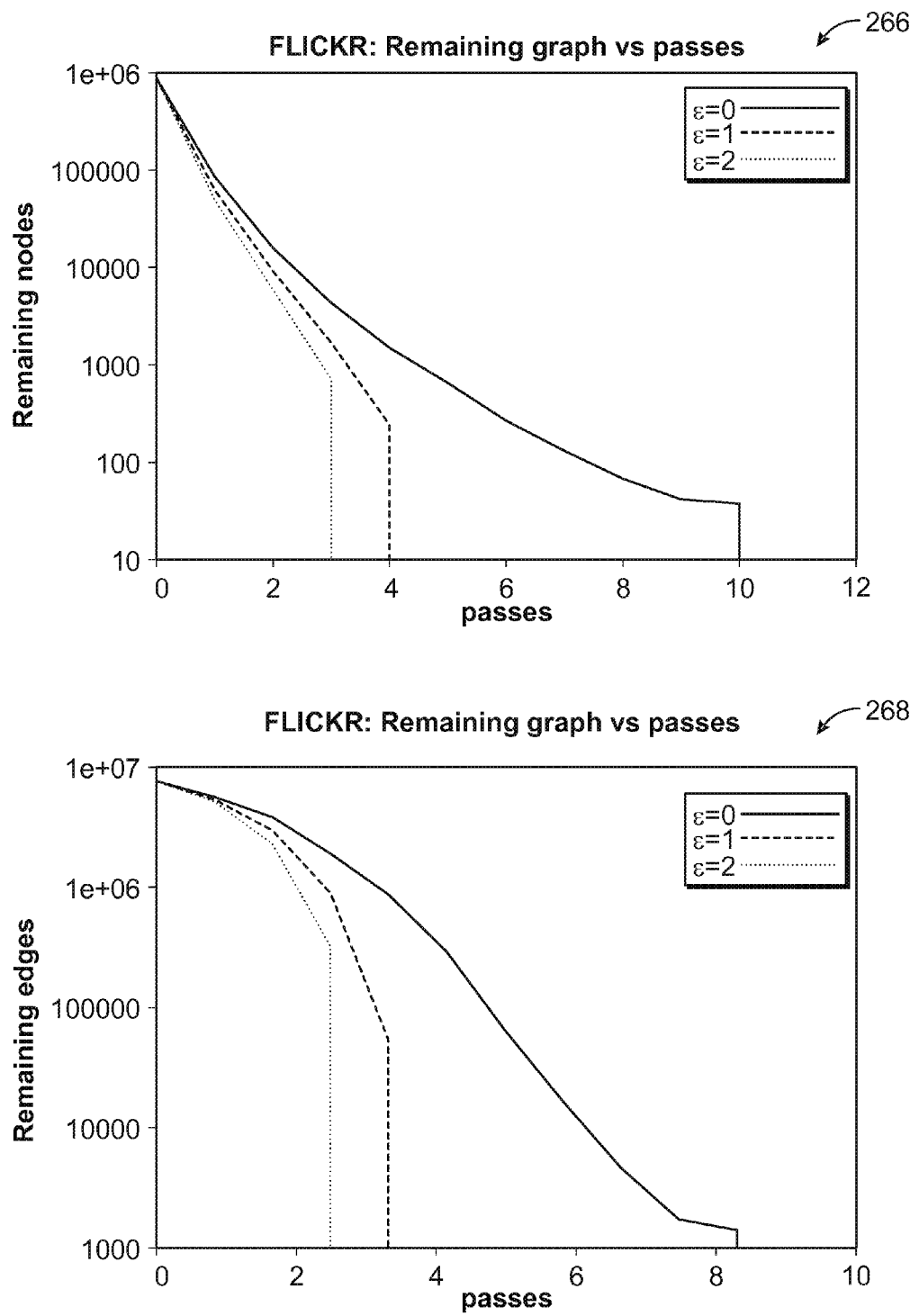
FIG. 11A shows graphs that plot remaining nodes and edges after each iteration of the method of FIGS. 4A and 4B or the method of FIGS. 7A and 7B versus a number of the iterations for the undirected graph, in accordance with another embodiment described in the present disclosure.

FIG. 11A is an embodiment of a graph 266 that plots remaining nodes after each iteration of the method 150 of 236 versus a number of the iterations of the method for the undirected graph 216 (FIG. 2B). The graph 266 is plotted for the Flickr™ service.

Also shown in FIG. 11A is an embodiment of a graph 268 that plots remaining edges after each iteration of the method 150 of 236 versus a number of the iterations of the method for the undirected graph 216 (FIG. 2B). The graph 268 is plotted for the Flickr™ service.

Figure 11B:
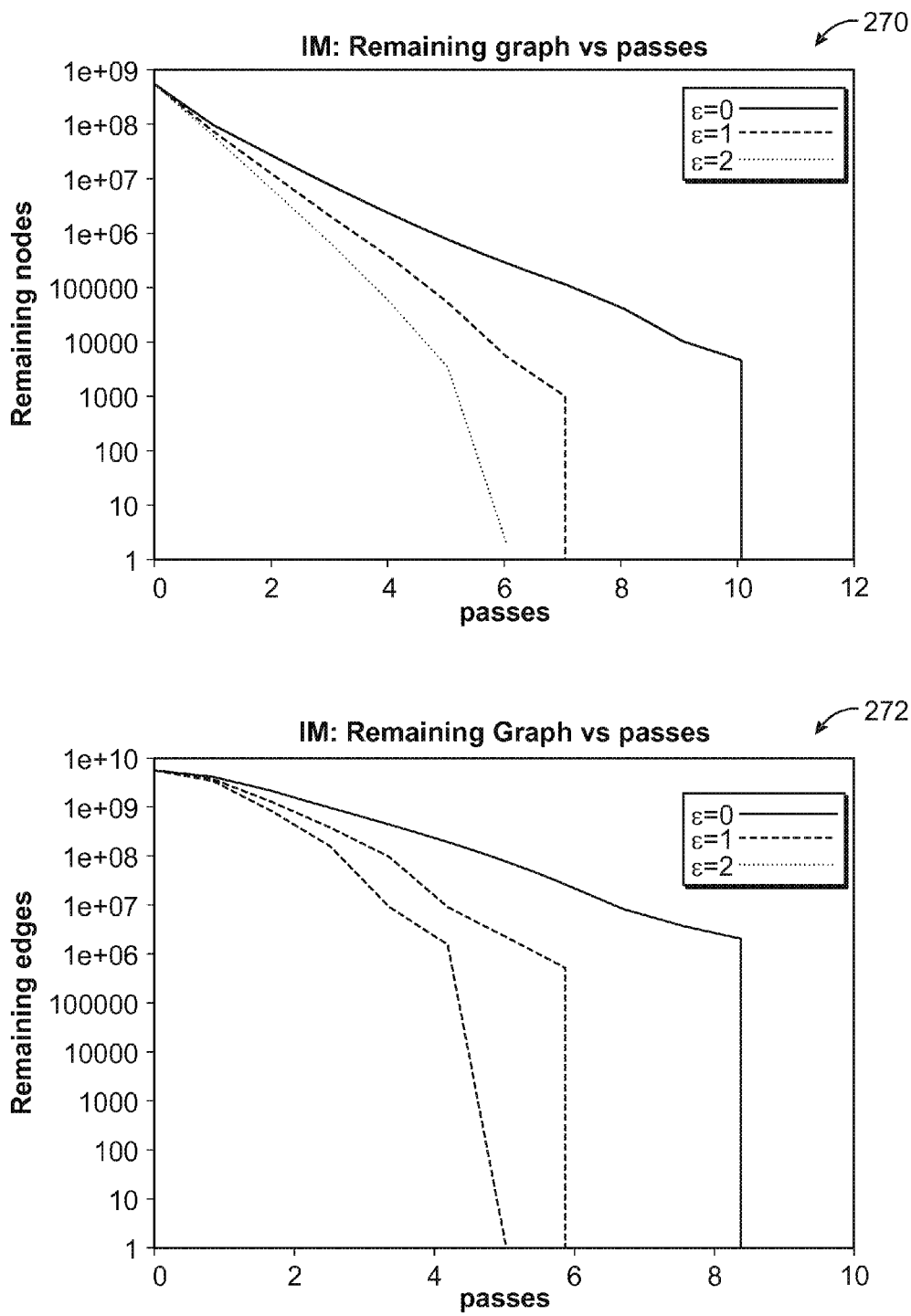
FIG. 11B shows graphs that plot remaining nodes and edges after each iteration of the method of FIGS. 4A and 4B or the method of FIGS. 7A and 7B versus a number of the iterations for the undirected graph, in accordance with an embodiment described in the present disclosure.

Shown in FIG. 11B is an embodiment of a graph 270 that plots remaining nodes after each iteration of the method 150 of 236 versus a number of the iterations of the method for the undirected graph 216 (FIG. 2B). The graph 266 is plotted for the IM service.

Further shown in FIG. 11B is an embodiment of a graph 272 that plots remaining edges after each iteration of the method 150 of 236 versus a number of the iterations of the method for the undirected graph 216 (FIG. 2B). The graph 272 is plotted for the IM service.

It should be noted that the graphs 266, 268, 270, and 272 get dramatically smaller during early iterations. In some embodiments, rest of the iterations of the method 150 or 236 can be performed in a main memory of a computing device, which is described below in FIG. 16.

Figure 12A:
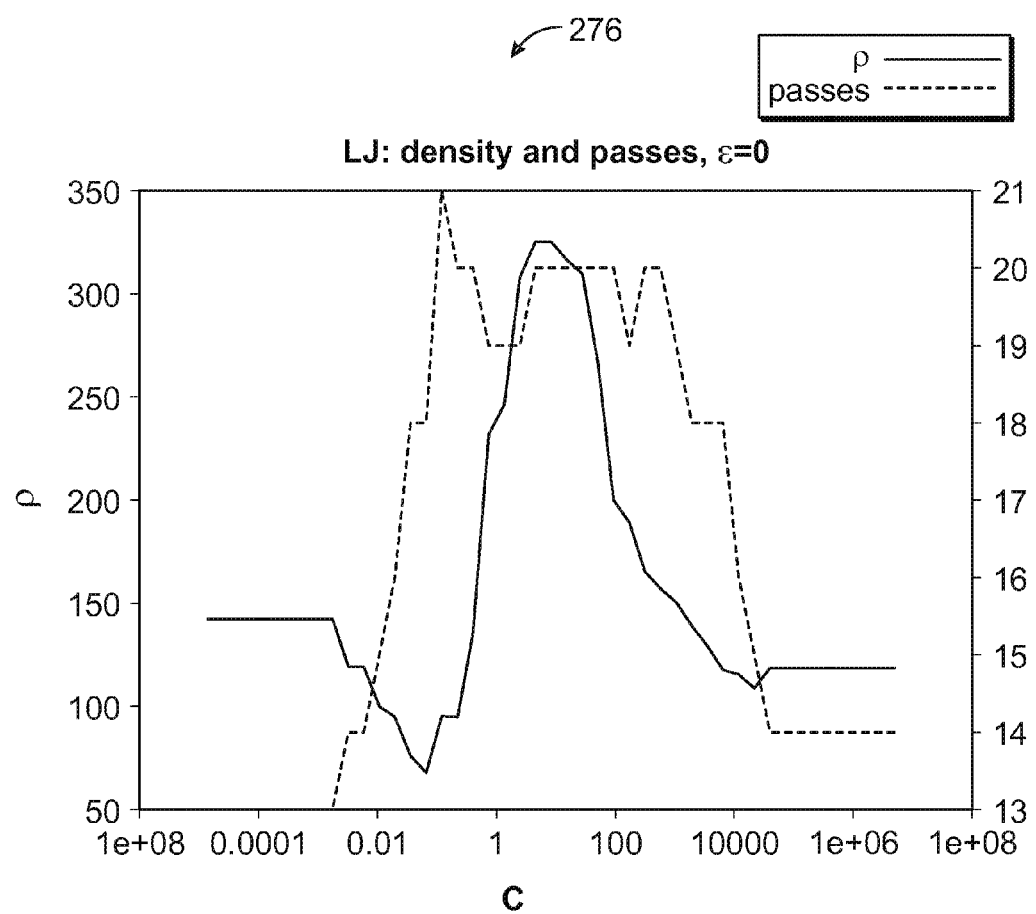
FIG. 12A shows a graph that plots a density of the directed graph to which the method of FIGS. 4A and 4B or the method of FIGS. 7A and 7B is applied versus a rational number c, in accordance with another embodiment described in the present disclosure.

FIG. 12A is an embodiment of a graph 276 that plots a density of the graph 202 and the updated graph 204 when the graphs 202 and 204 are directed graph and the method 150 or 336 is applied to graphs. The graph 276 plots the density on a y-axis versus the rational number c, which is plotted on an x-axis. The graph 276 plots the density p versus the rational number c for $\epsilon=0$. Also, the graph 276 plots a number of iterations of the method 150 or 336 that is applied to the directed graph 214 versus the rational number c. The graph 276 is produced based on data associated with a network formed by a LiveJournal™ (LJ), which is a social media platform where users share common passions and interests. As shown in graph 276, an optimum density occurs when relative sizes of From and To groups of the graphs 202 and 204 are not skewed. In several embodiments, an amount of time taken to execute the method 150 or 236 by one or more processors is equal to $$\frac{2\log n}{\log \delta} \qquad \text{eq. (11)}$$

where $\delta$ is a number of iterations of the method 150 or 236. A Table 1, shown below, shows a change in the density $\rho$ with a change in $\epsilon$ and $\delta$.

TABLE 1

| | δ | | |
|---|---|---|---|
| ε | 2 | 10 | 100 |
| 0 | 325.27 | 312.13 | 307.96 |
| 1 | 334.38 | 308.7 | 306.91 |
| 2 | 294.5 | 284.47 | 179.59 |

Table 1 is produced for LiveJournal™.

Figure 12B:
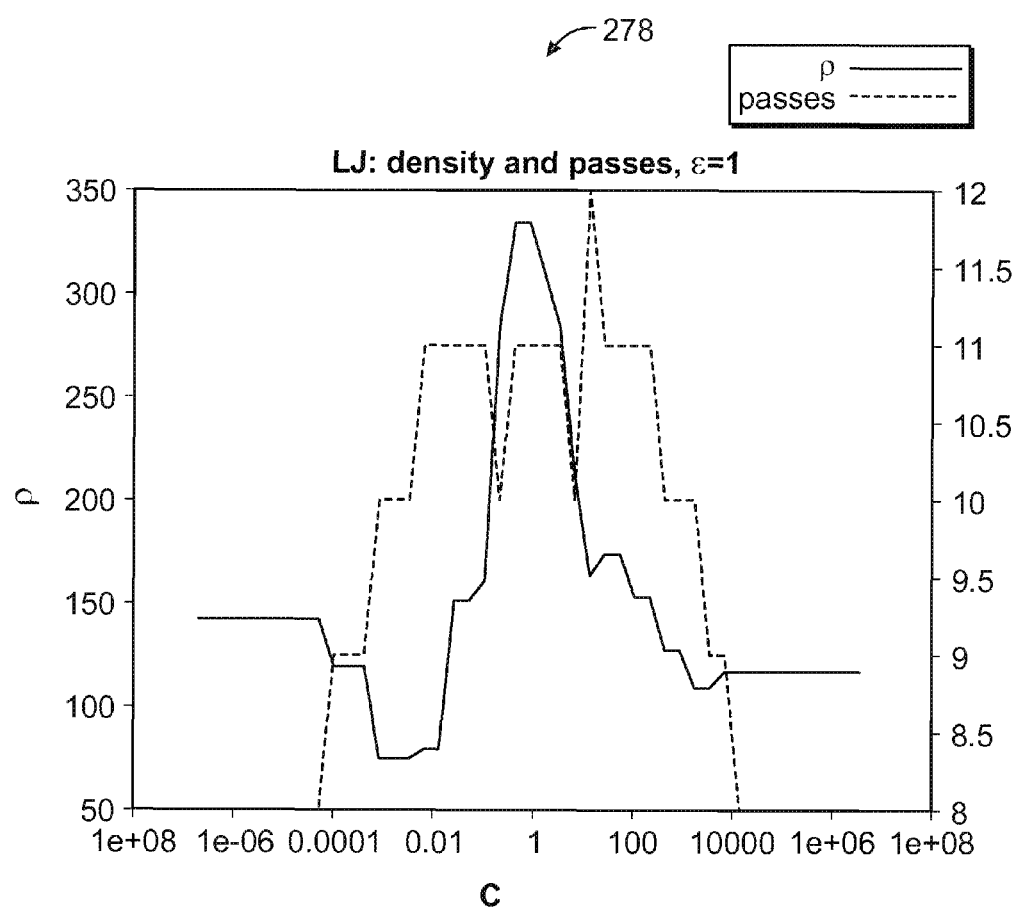
FIG. 12B shows a graph that plots a density of the directed graph to which the method of FIGS. 4A and 4B or the method of FIGS. 7A and 7B is applied versus a rational number c, in accordance with an embodiment described in the present disclosure.

Moreover, as shown in FIG. 12B, a graph 278 plots a density of the graph 202 and the updated graph 204 when the graphs 202 and 204 are directed graphs and when the method 150 or 336 (FIGS. 4A, 4B, 7A, 7B) is applied to the directed graphs. The graph 278 plots the density on a y-axis versus the rational number c, which is plotted on an x-axis. The graph 278 plots the density versus the rational number c for $\epsilon=1$. Also, the graph 278 plots a number of iterations of the method 150 or 336 that is applied to the directed graph 214 versus the rational number c. The graph 278 is produced based on data associated with a network formed by LiveJournal™.

Figure 13:
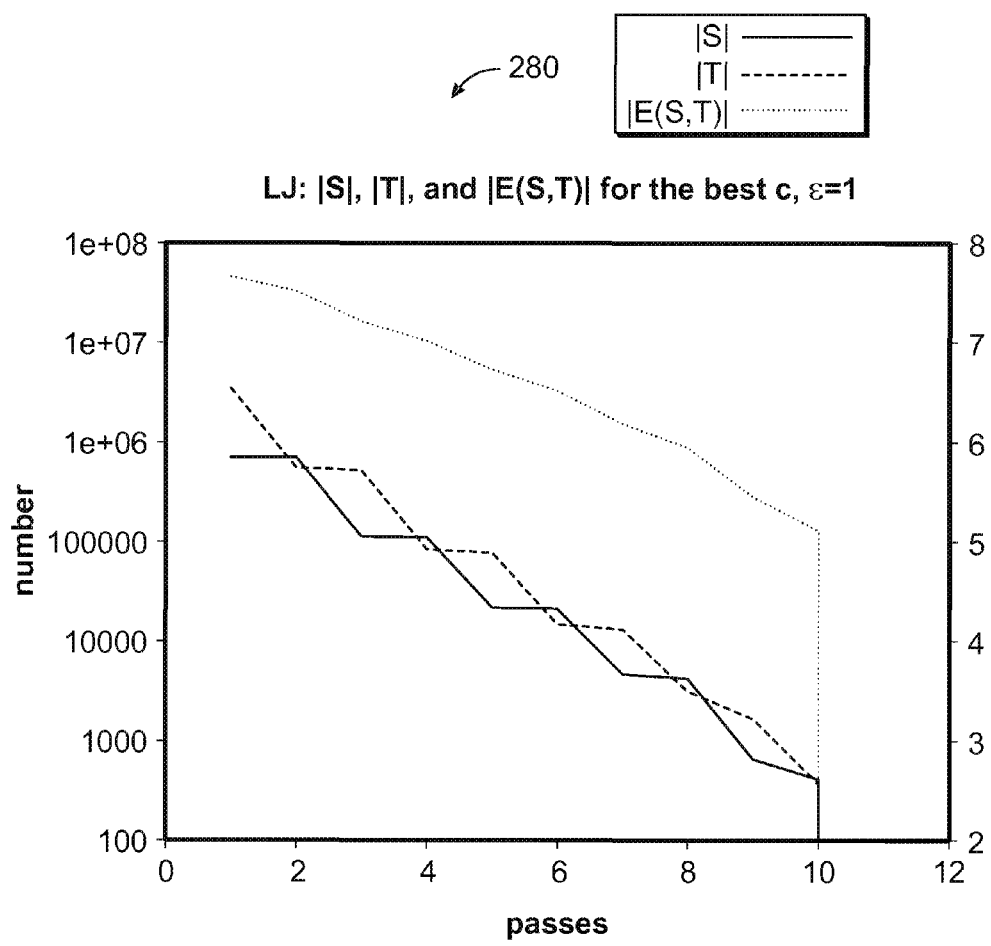
FIG. 13 is a graph that plots a number of nodes within the From groups of the graph and updated graph of FIG. 1 when the graphs are directed graphs and when the method of FIGS. 4A and 4B or the method of FIGS. 7A and 7B is applied to the directed graphs, in accordance with another embodiment described in the present disclosure.

FIG. 13 is an embodiment of a graph 280 that plots a number of nodes within the From groups of the graphs 202 and 204 (FIG. 1) when the graphs 202 and 204 are directed graphs and when the method 150 or 336 (FIGS. 4A, 4B, 7A, 7B) is applied to the directed graphs. The number of nodes of the From groups are plotted versus a number of iterations of the method 150 or 236.

Moreover, the graph 280 plots a number of nodes within the To groups of the graphs 202 and 204 when the graphs 202 and 204 are directed graphs and when the method 150 or 336 is applied to the directed graphs. The number of nodes of the To groups are plotted versus a number of iterations of the method 150 or 236.

The graph 280 further plots a number of edges between the From and To groups of the graphs 202 and 204 when the graphs 202 and 204 are directed graphs and when the method 150 or 336 is applied to the directed graphs. The number of edges between the From and To groups are plotted versus a number of iterations of the method 150 or 236. To generate the graph 280, a value of c=0.436, $\epsilon=1$, and $\delta=2$ are used.

Figure 14:
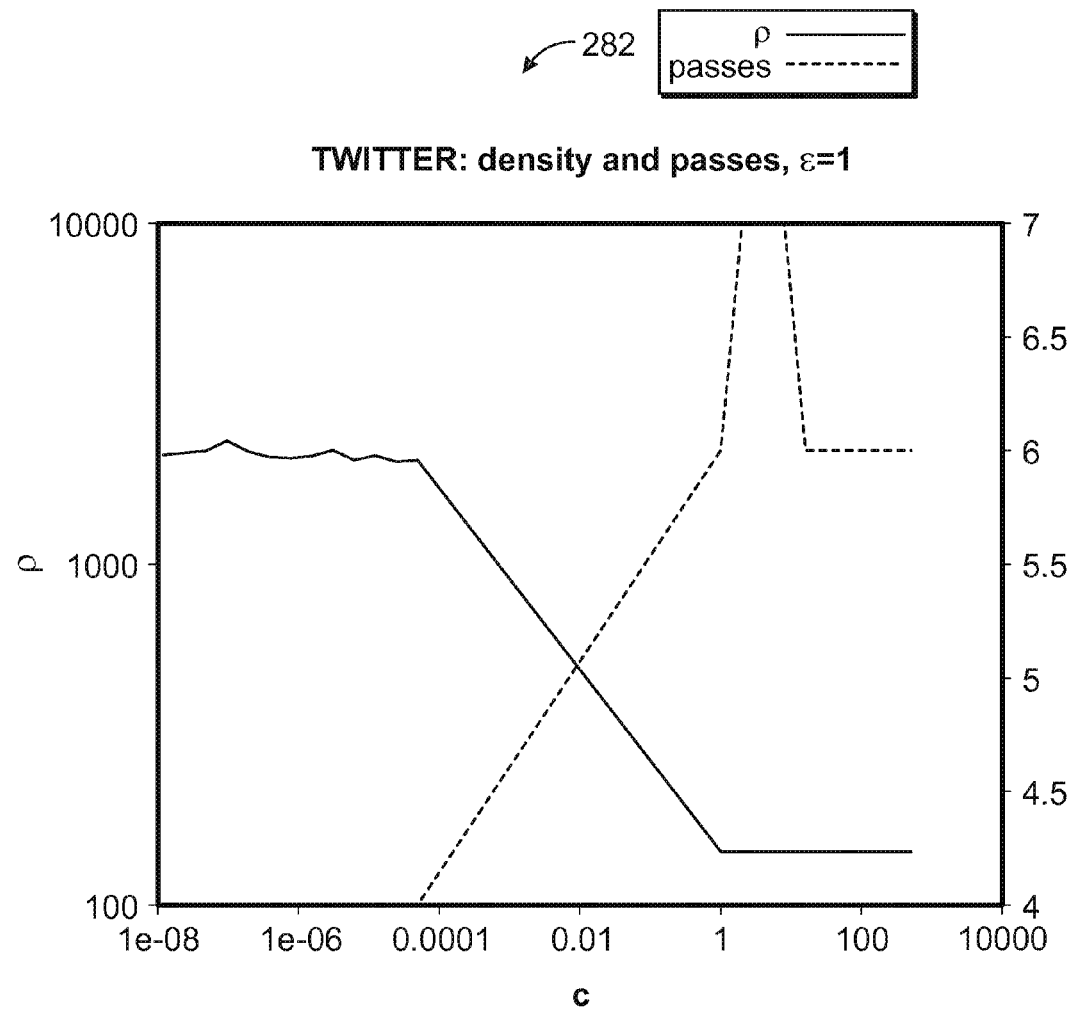
FIG. 14 is a graph that plots a density of the graph of FIG. 1 and a density of the updated graph of FIG. 1 when the graphs are directed graphs and when the method of FIGS. 4A and 4B or the method of FIGS. 7A and 7B is applied to the graphs versus the rational number c, in accordance with another embodiment described in the present disclosure.

FIG. 14 is an embodiment of a graph 282 that plots a density of the graph 202 and the updated graph 204 when the method 150 or 336 is applied to the directed graph 214 (FIG. 2A). The graph 282 plots the density on a y-axis versus the rational number c, which is plotted on an x-axis. The graph 282 plots the density versus the rational number c for $\epsilon=1$. Also, the graph 282 plots a number of iterations of the method 150 or 336 that is applied to the directed graph 214 versus the rational number c. The graph 282 is produced based on data associated with a network formed by Twitter™. It should be noted that an optimum value of c is approximately 1 as shown in the graph 282. This may a result of highly skewed nature of Twitter™. For example, there are 600 popular users who are followed by more than 300 million other users in Twitter™.

Figure 15:
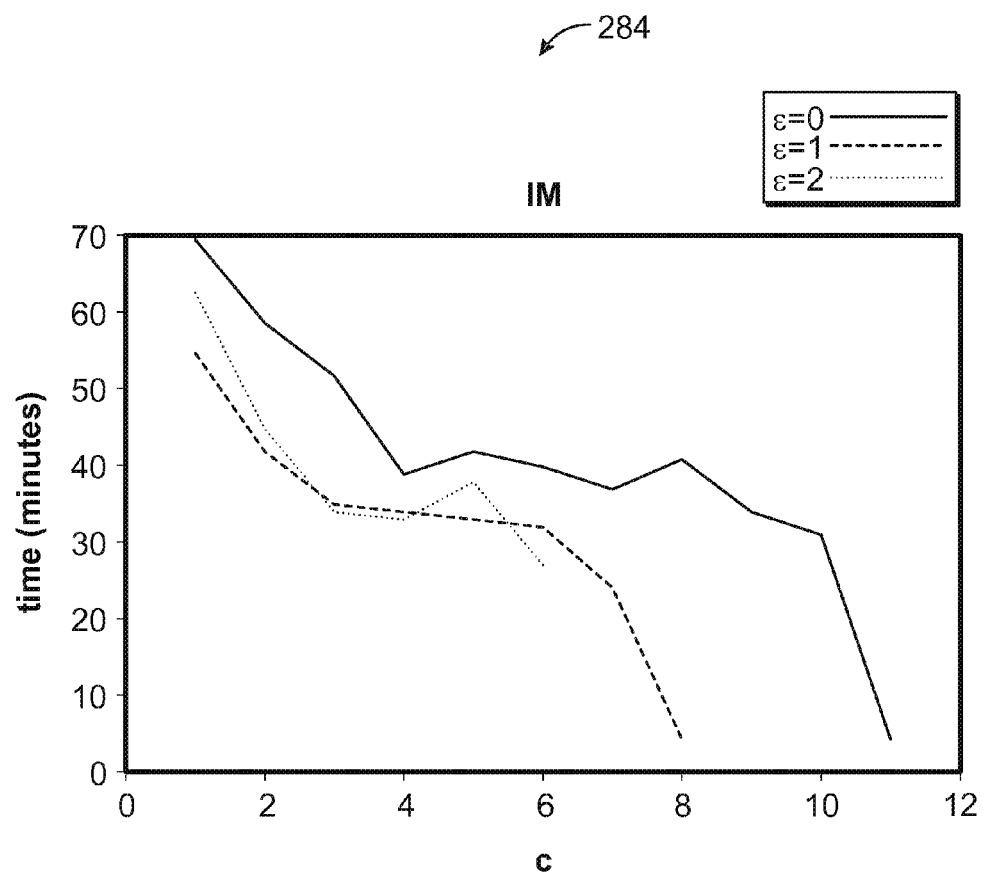
FIG. 15 is a graph that plots a time taken to execute the method of FIGS. 4A and 4B or the method of FIGS. 7A and 7B when the graph and the updated graph of FIG. 1 are undirected graphs versus a number of iterations of the method, in accordance with another embodiment described in the present disclosure.

FIG. 15 is an embodiment of a graph 284 that plots a time taken to execute the method 150 or 236 (FIGS. 4A, 4B, 7A, and 7B) when the graphs 202 and 204 (FIG. 1) are undirected graphs. The graph 284 plots the time taken on a y-axis and a number of iterations of the method 150 or 236 on an x-axis. The graph 284 is plotted for the IM service.

Figure 16:
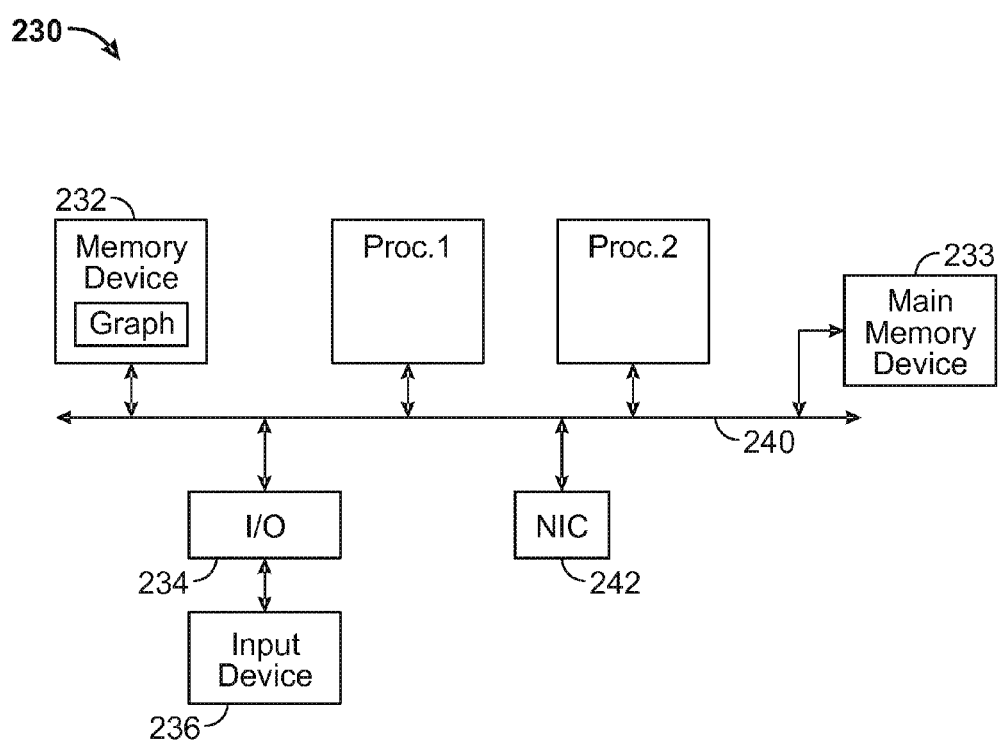
FIG. 16 shows a computing device that is used to execute the methods of FIGS. 4A, 4B, 7A and 7B, in accordance with another embodiment described in the present disclosure.

FIG. 16 shows one embodiment of a computing device 230 that is used to execute the methods 150 and 236 (FIGS. 4A, 4B, 7A, and 7B). In several embodiments, the computing device 230 is a server. In various embodiments, the computing device 230 is a client device. The computing device 230 may include more or less components than those shown in FIG. 8.

The computing device 230 includes the processors 1 and 2 in communication with a memory device 232 via a bus 240. The processors 1 and 2 are also in communication with a main memory device 233 via the bus 240. In some embodiments, a size of the main memory 233 is smaller than a size of the memory device 232. Computing device 230 also includes a network interface controller 242, an input device 236, and an input/output (I/O) interface 234. Examples of a network interface controller include network interface card and a network adapter. In several embodiments, instead of a network interface controller, a modem is used to communicate with a network. The network interface controller 242 includes circuitry for coupling computing device 230 to one or more networks, such as a local area network, a wide area network, or a combination thereof.

The input device 236 is coupled with the bus 240 via the input/output interface 234. Examples of an input device includes one or more buttons that are used to power-up and boot the computing device 230. In some embodiments, the input/output interface 234 converts an analog signal received from the input device 236 into a digital signal that is compatible with the bus 240. In various embodiments, the input/output interface 234 converts the digital signal that is received via the bus 240 to an analog signal that is sent to the input device 236.

In the embodiments in which the computing device 230 is a client device, the computing device 230 includes a set of speakers (not shown) that are coupled to the bus 240 via an audio interface (not shown). The audio interface performs a variety of audio-related processes, such as filtering audio data, sampling audio signals to generate the audio data, or a combination thereof. Moreover, in the embodiments in which the computing device 230 is a client device, the computing device includes a display device (not shown), such as, for example, a liquid crystal display device, a light emitting diode display device, a plasma display, or a cathode ray tube display.

Also, in the embodiments in which the computing device 230 is a client device, the input device 236 includes a keyboard, a mouse, a touchpad, a touch screen, a stylus, or a combination thereof.

Each of memory device 232 and the main memory device 233 includes a RAM, a ROM, or a combination thereof. Each of memory device 232 and the main memory device 233 illustrates an example of computer storage media for storage of information such as computer-readable instructions, data structures, program modules or other data. The main memory device 233 stores a basic input/output system ("BIOS") for controlling low-level operation of the computing device 230. The main memory device 233 also stores an operating system for controlling the operation of computing device 230. It will be appreciated that in one embodiment, the operating system includes UNIX™, LINUX™, or Windows™ operating system. The memory device 232 stores the graph 202, the updated graph 204, and/or the updated graph that is generated in the operation 180 (FIG. 7A).

It should be noted that although two processors 1 and 2 are shown within the computing device 230, in several embodiments, a different number of processors, such as one or more than two, are included within the computing device 230 and the different number of processors perform the operations described in the present disclosure.

Also, it should be noted that in several embodiments, more than two memory devices store data that is stored in the memory device 232.

Embodiments described in the present disclosure can be fabricated as computer-readable code on a non-transitory computer-readable storage medium, which is a storage device or a memory device. The non-transitory computer-readable storage medium holds data which can be read by a processor. Examples of the non-transitory computer-readable storage medium include network attached storage (NAS), a memory device, a ROM, a RAM, a combination of RAM and ROM, a Compact Disc (CD), a Blu-Ray™ disc, a flash memory, a hard disk, and a magnetic tape. The non-transitory computer-readable storage medium may be distributed over a network-coupled computer system so that the computer readable code is stored and executed in a distributed fashion.

Although various embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for generating a dense graph, the method comprising:
   (a) receiving a graph;
   (b) calculating a density of the graph;
   (c) computing a threshold to apply to the graph, the threshold including the density of the graph;
   (d) determining whether the graph includes a first set of at least one node;
   (e) determining whether a second set of at least one node from the first set meets the threshold;
   (f) removing the at least one node of the second set from the graph upon determining that the at least one node of the second set meets the threshold, wherein the removing is performing to generate an updated graph;
   (g) determining whether a density of the updated graph is greater than a density of the graph;
   (h) replacing the graph with the updated graph upon determining that the density of the updated graph is greater than the density of the graph calculated during execution of the method;
   (i) controlling a number of iterations of the method by changing a multiple of the density of the graph, wherein the multiple is greater than one,
   wherein the method is executed by one or more processors.

2. The method of claim 1, wherein the graph includes an undirected graph or a directed graph.

3. The method of claim 1, wherein each node includes a network node, a web account, a web page, a web site, or a gene.

4. The method of claim 1, wherein computing the threshold comprises determining the multiple of the density of the graph.

5. The method of claim 1, wherein the density of the graph is equal to a ratio of size of edges within the graph to a size of nodes in the graph.

6. The method of claim 1, wherein the at least one node of the second set includes two or more nodes, wherein the two or more nodes of the second set include a first node and a second node, wherein determining whether the second set meets the threshold comprises determining whether the two or more nodes of the second set meet the threshold, wherein determining whether the two or more nodes of the second set meet the threshold comprises concurrently determining by a first one of the one or more processors and a second one of the one or more processors whether the two or more nodes of the second set meet the threshold, wherein the first processor determines whether a degree of the first node is less than or equal to the threshold, wherein the second processor determines whether a degree of the second node is less than or equal to the threshold.

7. The method of claim 1, wherein the at least one node of the second set includes two or more nodes, wherein the two or more nodes of the second set include a first node and a second node, wherein removing the at least one node of the second set comprises removing the two or more nodes of the second set concurrently, wherein removing the two or more nodes of the second set comprises deleting by a first one of the one or more processors the first node from the graph simultaneous with deleting by a second one of the one or more processors the second node from the graph.

8. The method of claim 1, further comprising (i) repeating (a) thru (h) by using the updated graph instead of the graph upon determining that the density of the updated graph is greater than the density of the graph.

9. The method of claim 1, wherein the at least one node of the second set includes two or more nodes, wherein removing the at least one node of the second set comprises removing two or more nodes of the second set, wherein removing the two or more nodes comprises removing a constant fraction of nodes from the graph during each iteration of the method.

10. The method of claim 1, further comprising determining whether a size of nodes of the updated graph is greater than a size of nodes of the graph, wherein the replacing the graph with the updated graph is performed upon determining that the size of the nodes of the updated graph is greater than the size of the nodes of the graph.

11. The method of claim 1, wherein the graph includes a directed graph that includes a From group of nodes and a To group of nodes, wherein computing the threshold comprises calculating a ratio of a size of edges from the From group to the To group and a size of the nodes within the To group.

12. The method of claim 1, wherein the graph includes a directed graph that includes a From group of nodes and a To group of nodes, wherein determining whether the graph includes the first set of at two nodes comprises determining whether the From group includes at least one node and the To group includes at least one node.

13. The method of claim 1, wherein the graph includes a directed graph that includes a From group of nodes and a To group of nodes, wherein the at least one node of the second set includes two or more nodes, wherein the two or more nodes of the second set include a first node and a second node, the first node belonging to the From group, the second node belonging to the To group, wherein the threshold includes a first threshold, wherein determining whether the second set meets the threshold comprises determining by a first one of the one or more processors whether an outdegree of the first node meets the first threshold, wherein determining whether the outdegree of the first node meets the first threshold is performed concurrently with determining by a second one of the one or more processors whether an indegree of the second node meets a second threshold.

14. The method of claim 1, wherein the at least one node of the second set includes two or more nodes, wherein the two or more nodes of the second set include a first node and a second node, wherein the graph includes a directed graph that includes a From group of nodes and a To group of nodes, the updated graph including an updated From group of nodes and an updated To group of nodes, wherein removing the at least one node of the second set comprise removing two or more nodes of the second set, wherein removing the two or more nodes of the second set comprises deleting the first node from the From group simultaneous with deleting the second node from the To group, wherein the deleting the first node from the From group is performed to generate the updated From group and the deleting the second node from the To group is performed to generate the updated To group.

15. The method of claim 1, wherein the graph includes a directed graph that includes a From group of nodes and a To group of nodes, wherein the updated graph includes a directed graph that includes an updated From group of nodes and an updated To group of nodes, wherein the density of the directed graph is equal to a ratio of size of edges within the directed graph to a size of a geometric mean of sizes of nodes within the From and To groups, wherein the density of the updated graph is equal to a ratio of size of edges within the updated graph to a size of a geometric mean of sizes of nodes within the updated From and To groups.

16. The method of claim 1, wherein the graph includes a directed graph that includes a From group of nodes and a To group of nodes, wherein the updated graph includes a directed graph that includes an updated From group of nodes and an updated To group of nodes, wherein replacing the graph with the updated graph includes replacing the From group with the updated From group and the To group with the updated To group.

17. A system for determining a subgraph within a graph, the system comprising:
　a memory device configured to receive the graph;
　one or more processors configured to:
　　(a) calculate a density of the graph;
　　(b) compute a threshold to apply to the graph, the threshold including the density of the graph;
　　(c) determine whether the graph includes a first set of at least one node;
　　(d) determine whether a second set of at least one node from the first set meets the threshold;
　　(e) remove the at least one node of the second set from the graph upon determining that the at least one node of the second set meets the threshold, wherein the removal is performed to generate an updated graph;
　　(f) determine whether a density of the updated graph is greater than a density of the graph;
　　(g) replace the graph within the updated graph upon determining that the density of the updated graph is greater than the density of the graph calculated in (b); and
　　(h) control a number of iterations of the method by changing a multiple of the density of the graph, wherein the multiple is greater than one.

18. The system of claim 17, wherein the at least one node of the second set includes two or more nodes, wherein the two or more nodes of the second set include a first node and a second node, wherein the one or more processors include a first processor and a second processor, the first and second processors configured to concurrently determine whether the two or more nodes of the second set meet the threshold, wherein the first processor determines whether a degree of the first node is less than or equal to the threshold, wherein the second processor determines whether a degree of the second node is less than or equal to the threshold.

19. The system of claim 17, wherein each node includes a network node, a web account, a web page, a web site, or a gene.

20. A non-transitory computer-readable medium having instructions for causing a computer to execute a method comprising:
　(a) receiving a graph;
　(b) calculating a density of the graph;
　(c) computing a threshold to apply to the graph, the threshold including the density of the graph;
　(d) determining whether the graph includes a first set of at least one node;
　(e) determining whether a second set of at least one node from the first set meets the threshold;

(f) removing the at least one node of the second set from the graph upon determining that the at least one node of the second set meets the threshold, wherein said removing is performed to generate an updated graph;
(g) determining whether a density of the updated graph is greater than a density of the graph;
(h) replacing the graph within the updated graph upon determining that the density of the updated graph is greater than the density of the graph calculated during execution of the method; and
(i) controlling a number of iterations of the method by changing a multiple of the density of the graph, wherein the multiple is greater than one.

* * * * *